United States Patent
Choi

(10) Patent No.: US 11,522,714 B2
(45) Date of Patent: Dec. 6, 2022

(54) USER APPARATUS USING BLOCK CHAIN, BLOCK CHAIN SYSTEM INCLUDING THE SAME AND PRODUCT INFORMATION MANAGING METHOD THEREOF

(71) Applicant: SAMSUNG ELECTRONICS CO., LTD., Suwon-si (KR)

(72) Inventor: Myung-sik Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 803 days.

(21) Appl. No.: 16/421,955

(22) Filed: May 24, 2019

(65) Prior Publication Data
US 2019/0372777 A1 Dec. 5, 2019

(30) Foreign Application Priority Data
Jun. 4, 2018 (KR) .......................... 10-2018-0064479

(51) Int. Cl.
| | | |
|---|---|---|
| *H04L 9/32* | (2006.01) | |
| *H04L 9/06* | (2006.01) | |
| *H04L 9/30* | (2006.01) | |
| *H04L 9/08* | (2006.01) | |
| *G06F 16/182* | (2019.01) | |
| *H04L 9/00* | (2022.01) | |

(52) U.S. Cl.
CPC ........ *H04L 9/3247* (2013.01); *G06F 16/1824* (2019.01); *H04L 9/0643* (2013.01); *H04L 9/0894* (2013.01); *H04L 9/30* (2013.01); *H04L 9/50* (2022.05)

(58) Field of Classification Search
None
See application file for complete search history.

(56) References Cited

U.S. PATENT DOCUMENTS

| | | |
|---|---|---|
| 9,635,000 B1 | 4/2017 | Muftic |
| 10,164,779 B2 | 12/2018 | Uhr et al. |

(Continued)

FOREIGN PATENT DOCUMENTS

| | | |
|---|---|---|
| KR | 10-1637863 B1 | 7/2016 |
| KR | 10-1678795 B1 | 11/2016 |

(Continued)

OTHER PUBLICATIONS

Nakamoto, "Bitcoin: A Peer-to-Peer Electronic Cash System", Oct. 2008, 18 total pages.

*Primary Examiner* — Uyen T Le
(74) *Attorney, Agent, or Firm* — Sughrue Mion, PLLC

(57) ABSTRACT

A product for participating in a block chain system includes: a network interface configured to communicate, by using a first network, with participants of the block chain system to share block chain data, the block chain data including at least one of an ownership record block and an ownership registration block for the product; an output circuitry configured to output a notification signal; and a processor configured to determine, during a booting operation of the product, whether ownership of the product is registered in the block chain data through the network interface and to control the output circuitry to output a message requesting registration of an ownership of the product based on a determination that the ownership of the product is not registered in the block chain data.

15 Claims, 30 Drawing Sheets

(56) References Cited

U.S. PATENT DOCUMENTS

| | | | | |
|---|---|---|---|---|
| 2001/0054082 | A1* | 12/2001 | Rudolph | G06F 16/955 |
| | | | | 707/E17.112 |
| 2004/0172396 | A1* | 9/2004 | Vanska | H04L 63/0442 |
| | | | | 707/999.009 |
| 2005/0241026 | A1* | 10/2005 | Esler | A61N 1/37258 |
| | | | | D24/100 |
| 2009/0072951 | A1* | 3/2009 | Alberth, Jr. | G06Q 30/0252 |
| | | | | 340/10.41 |
| 2015/0127940 | A1 | 5/2015 | Polehn et al. | |
| 2015/0269570 | A1* | 9/2015 | Phan | G06Q 20/3276 |
| | | | | 705/71 |
| 2016/0330035 | A1 | 11/2016 | Ebrahimi et al. | |
| 2016/0358186 | A1* | 12/2016 | Radocchia | H04W 12/02 |
| 2017/0033932 | A1 | 2/2017 | Truu et al. | |
| 2017/0206532 | A1* | 7/2017 | Choi | G06Q 30/02 |
| 2017/0232300 | A1 | 8/2017 | Tran et al. | |
| 2017/0330180 | A1 | 11/2017 | Song et al. | |
| 2018/0117447 | A1* | 5/2018 | Tran | A63B 71/145 |
| 2018/0254905 | A1 | 9/2018 | Chun | |
| 2018/0314868 | A1 | 11/2018 | Raynesford | H04L 9/3239 |
| 2018/0331837 | A1 | 11/2018 | Uhr et al. | |
| 2019/0349426 | A1* | 11/2019 | Smith | H04W 4/08 |

FOREIGN PATENT DOCUMENTS

| | | |
|---|---|---|
| KR | 10-1680260 B1 | 11/2016 |
| KR | 10-1680542 B1 | 12/2016 |
| KR | 10-1799343 B1 | 11/2017 |
| KR | 10-1818601 B1 | 1/2018 |

\* cited by examiner

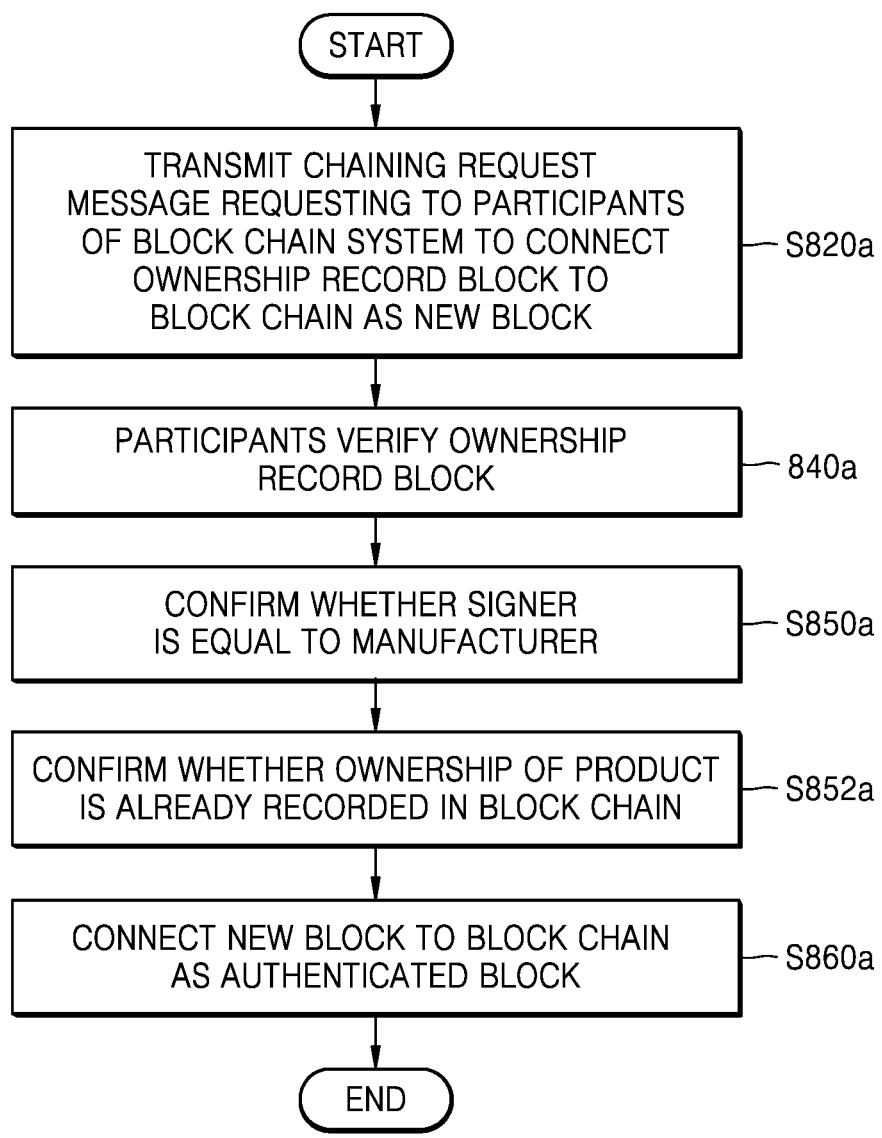

USER APPARATUS USING BLOCK CHAIN, BLOCK CHAIN SYSTEM INCLUDING THE SAME AND PRODUCT INFORMATION MANAGING METHOD THEREOF

CROSS-REFERENCE TO RELATED APPLICATION

This application claims priority from Korean Patent Application No. 10-2018-0064479, filed on Jun. 4, 2018, in the Korean Intellectual Property Office, the disclosure of which is incorporated herein in its entirety by reference.

BACKGROUND

1. Field

One or more example embodiment of the disclosure relate to a user apparatus, a block chain system, and a product information management method thereof, and more particularly, to a user apparatus for managing product information using a block chain, a block chain system, and a product information management method thereof.

2. Description of the Related Art

Since the authenticity of products produced and sold by a manufacturer may be directly linked to the quality of the products and the flood of counterfeit products may cause considerable damage to the manufacturer, various products including an electronic device undergo a genuine authentication process before being sold and used by consumers.

A centralized authentication method has been used for existing product authentication, in which a single authentication server authenticates each of a plurality of products. When such a centralized authentication method is used, it takes a considerable amount of money to manage, maintain and repair the authentication server, and it is difficult to recover authentication information when the authentication information is leaked by various hacks, etc., and is vulnerable to a distributed denial of service (DDoS) attack.

Therefore, there is a need for an authentication method and/or a product information management method capable of solving the problems of the conventional centralized authentication method.

SUMMARY

One or more example embodiments provide a method and an apparatus capable of reducing maintenance cost, enhancing security, and tracking a transfer path of product ownership transparently, in a computing system, a block chain system including the same, and a product information management method thereof.

According to an aspect of an example embodiment, there is provided a product for participating in a block chain system including: a network interface configured to communicate, by using a first network, with participants of the block chain system to share block chain data, the block chain data including at least one of an ownership record block and an ownership registration block for the product; an output circuitry configured to output a notification signal; and a processor configured to determine, during a booting operation of the product, whether ownership of the product is registered in the block chain data through the network interface and to control the output circuitry to output a message requesting registration of an ownership of the product based on a determination that the ownership of the product is not registered in the block chain data.

According to another aspect of an example embodiment, there is provided a user apparatus for participating in a block chain system, the user apparatus configured to communicate with a product through a first network, the user apparatus including: at least one processor; and at least one memory configured to store instructions, which, when executed by the at least one processor, cause the at least one processor to perform: receiving block chain data from at least one of block chain participants connected to the user apparatus through a second network; requesting a first signer and the product to sign for first information including a first public key corresponding to the user apparatus.

According to another aspect of an example embodiment, there is provided a method of managing product information by using a block chain system, the method including: generating a genesis block of block chain data used in the block chain system, the genesis block being generated based on a public key of a manufacturer of a product; generating a first payload including a first signature of the manufacturer for a public key of the product; generating an ownership record block of the product based on the first payload and an additional signature of the product for the first payload; and transmitting a chaining request message including the ownership record block to participants of the block chain system.

According to another aspect of an example embodiment, there is provided a method of managing product information by a participant in a block chain system, the method including: receiving, by the participant, a chaining request message including a new block, the new block including a first signature of a first signer for a first public key corresponding to a user apparatus and a second signature of a product for the first public key corresponding to the user apparatus; verifying, by the participant, the new block by using block chain data stored in the participant; and chaining, by the participant, the new block to the block chain data based on verification of the new block.

According to another aspect of an example embodiment, there is provided a non-transitory computer-readable storage medium configured to store block chain data used for managing information about ownership of a product by user apparatus and participants of a block chain system, wherein the block chain data includes: a genesis block generated by a manufacturer of the product and including a public key of the manufacturer; and a product ownership record block generated by the manufacturer of the product and including a first signature of the manufacturer for a public key of the product and a second signature of the product for warranty information of the product.

BRIEF DESCRIPTION OF THE DRAWINGS

These and/or other aspects of the disclosure will become apparent and more readily appreciated from the following description of the example embodiments, taken in conjunction with the accompanying drawings, in which:

FIG. 19A is a flowchart of a block chain participation process in an ownership record operation, according to an example embodiment;

DETAILED DESCRIPTION

Hereinafter, embodiments will be described in detail with reference to the accompanying drawings.

Figure 1:
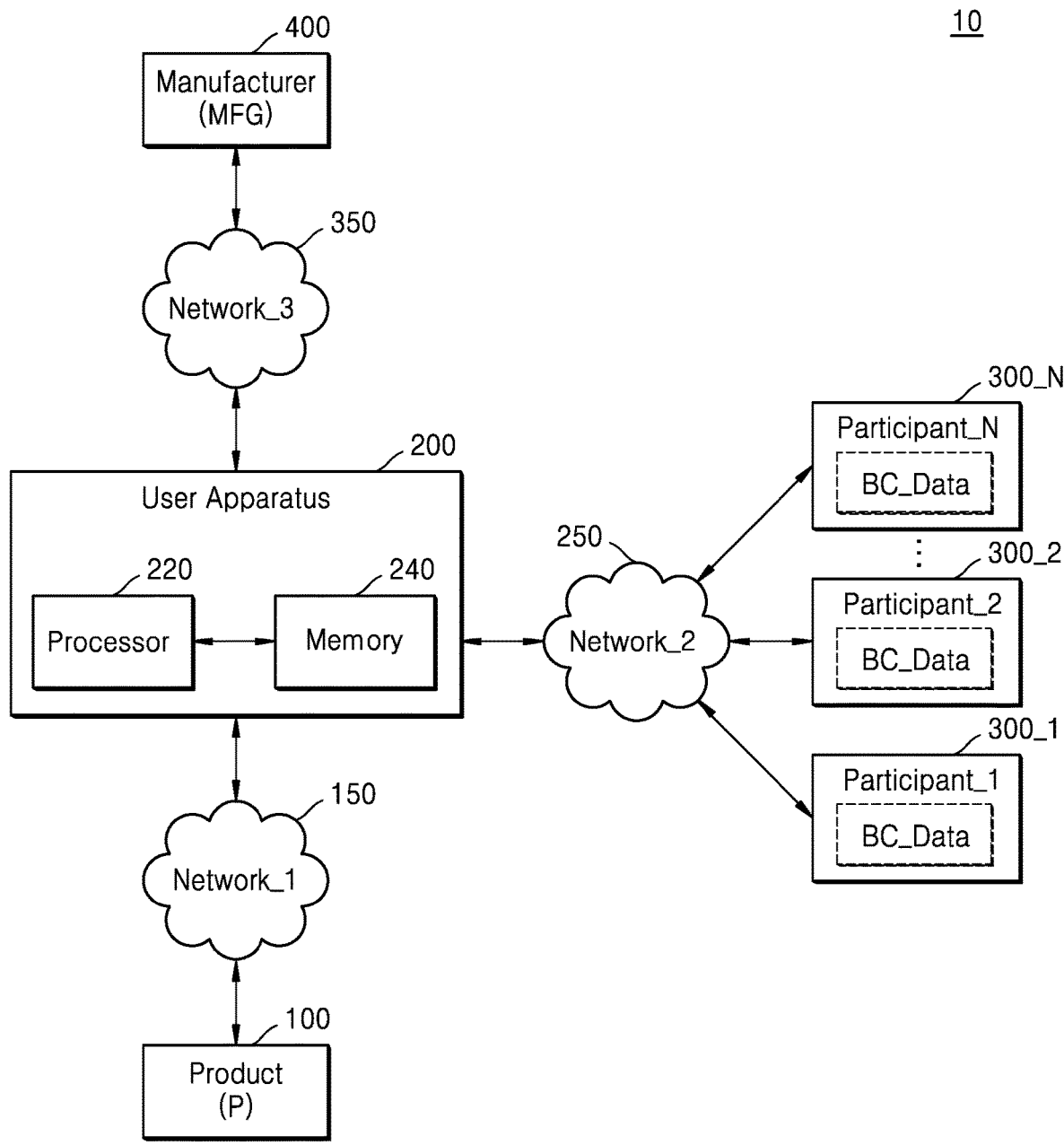
FIG. 1 is a view of a block chain system according to an example embodiment.

FIG. 1 shows a block chain system 10 according to an example embodiment. The block chain system 10 may include a product 100, a user apparatus 200, a first participant 300_1, a second participant 300_2, . . . and an $N^{th}$ participant 300_N (where N is a natural number), and a manufacturer 400 (or an apparatus of a manufacturer). Hereinafter, the term "a manufacturer" and "an apparatus of a manufacturer" may be interchangeably used.

The product 100 may include any product capable of communicating with the user apparatus 200, such as electronic products and automotive products. The product 100 may include, for example but is not limited to, home appliances, medical devices, navigation devices, automotive infotainment devices, marine electronic devices, avionics devices, security devices, industrial or household robots, an automated teller machine (ATM) of a financial institution, a point of sales (POS) of a store, or an Internet of Things (IoT), streetlights, fitness devices, or electronic devices. The home appliances may include, for example but not limited to televisions (TVs), digital versatile disc (DVD) players, audio players, refrigerators, air conditioners, vacuum cleaners, ovens, microwave ovens, washing machines, air purifiers, set-top boxes, home automation control panels, security control panels, TV boxes, game consoles, electronic dictionaries, electronic keys, camcorders, electronic frames, electric ranges, rice cookers, multipurpose cooking utensils, or coffee pots. The medical devices may include a heart rate monitor, a blood pressure monitor, a magnetic resonance imaging (MRI) device, or an ultrasonic device. The electronic devices may include a smart phone, a tablet personal computer (PC), a desktop PC, a laptop PC, a netbook computer, a workstation, a server, a personal digital assistant (PDA), a portable multimedia player (PMP), an MP3 player, a camera, a smart watch, or a solid state drive (SSD).

The product 100 may communicate with the user apparatus 200 through a first network 150. The first network 150 may be a wired network. For example, the product 100 and the user apparatus 200 may be connected to each other by an electric wire. However, the disclosure is not limited thereto, and the first network 150 may be a wireless network. For example, the first network 150 may be a short-range wireless network. For example, the first network 150 may support communication using at least one of technologies such as Bluetooth, radio frequency identification (RFID), infrared data association (IrDA), an ultra-wideband (UWB), ZigBee, near field communication (NFC), wireless-fidelity (Wi-Fi), Wi-Fi Direct, wireless universal serial bus (wireless USB), and the like. Information about the product 100 may be provided to the user apparatus 200 through the first network 150, and the user apparatus 200 may manage the information about the product 100. In an embodiment, the user apparatus 200 may manage the information about the product 100 by registering ownership of the product 100 in a block chain. Also, in an embodiment, the user apparatus 200 of a user who receives the product 100 may manage the information about the product 100 by chaining information about ownership transfer of the product 100 to an ownership block chain.

In this specification, the phrase "chaining information to a block chain" may be used to mean that a data block generated using information is included in block chain data by being connected to the block chain data shared by participants (e.g., users, block chain nodes). The phrase "chaining information to a block chain" may also be referred to as connecting information to a block chain or as participating information in a block chain.

The user apparatus 200 may be a user apparatus that communicates with the product 100 through the first network 150. The user apparatus 200 may include, but is not limited to, at least one of a variety of computing devices such as a smart phone, a laptop PC, or a desktop PC.

The user apparatus 200 may communicate with participants of the block chain system 10 through a second network 250 and with the apparatus 400 of the manufacturer (or the manufacturer apparatus 400) through a third network 350.

The second network 250 may be, but is not limited to, a wired Internet network or a wireless Internet network. The third network 350 may also be, for example but is not limited to, a wired Internet network or a wireless Internet network. In an embodiment, the second network 250 and the third network 350 may be an identical type of network.

The user apparatus 200 may receive block chain data from at least one of the first participant 300_1 to the $N^{th}$ participant 300_N through the second network 250. The block chain data is described in FIG. 2A. The user apparatus 200 may generate a new block related to information about the product 100. The user apparatus 200 may transmit a message requesting the first participant 300_1 to the $N^{th}$ participant 300_N to chain the new block to the block chain through the second network 250.

The user apparatus 200 may include a processor (or at least one processor) 220 and a memory (or at least one memory) 240. Instructions related to certain operations performed in the user apparatus 200 may be stored in the memory 240 and certain operations may be performed by the user apparatus 200 based on the instructions stored in the memory 240 that are executed by the processor 220. In other words, operations of the user apparatus 200, which will be described with reference to the following drawings, may be performed by instructions that are stored in the memory 240 being executed by the processor 220.

The processor 220 may include a central processing unit, a microprocessor, a digital signal processor, an application processor, a programmable array, an application-specific integrated circuit or the like.

The first participant 300_1 to the $N^{th}$ participant 300_N may represent user apparatuses participating in the block chain system 10. Each of the first to the $N^{th}$ participants 300_1 to 300_N may store block chain data BC_Data. For example, each of the first to the $N^{th}$ participants 300_1 to 300_N may include a non-transitory computer-readable storage medium, and the non-transitory computer-readable storage medium may store the block chain data BC_Data. The block chain data BC_Data may represent data that the user apparatus 200 and the participants of the block chain system 10 use to manage information about ownership of the product 100. The block chain data BC_Data will be described in more detail with reference to FIGS. 2A and 2B.

For convenience of description of the first participant 300_1 to the $N^{th}$ participant 300_N, the first participant 300_1 will be described as an example. The first participant 300_1 may include a storage medium storing instructions for performing certain operations. Based on the instructions stored in the storage medium executed by at least one processor in the first participant 300_1, certain operations may be performed by the first participant 300_1. In other words, operations of the first participant 300_1, which will be described with reference to the following drawings, may be performed by the instructions stored in the storage medium being executed by the processor.

The manufacturer apparatus 400 is an apparatus of the manufacturer of the product 100 and may communicate with the user apparatus 200 through the third network 350. The manufacturer apparatus 400 may generate a genesis block of block chain data. The manufacturer apparatus 400 may also generate ownership record block of the product 100 before selling the product 100 to purchasers and may record ownership of the product 100 in a block chain by chaining the ownership record block to a block chain. Upon generation of the ownership registration block of the product 100 of the user apparatus 200, the manufacturer apparatus 400 may respond to a request of the user apparatus 200 to transmit a signature for a public key corresponding to the user apparatus 200 to the user apparatus 200. The signature may be a digital signature.

According to the block chain system 10 according to an example embodiment, by using a block chain to manage product information, a manufacturer does not need to have a separate authentication server, which reduces maintenance cost, enhances security, and allows for transparent tracking of an ownership transfer path.

Figure 2A:
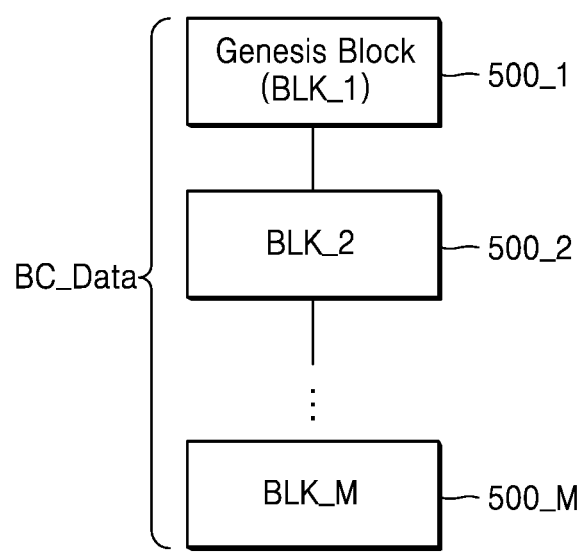
FIG. 2A is a view of block chain data according to an example embodiment.

FIG. 2A is a view of block chain data BC_Data according to an example embodiment.

The block chain data BC_Data may include a first block 500_1 to an $M^{th}$ block 500_M (where M is a natural number). Each block may be referred to as a data block, and the first block 500_1 may be referred to as a genesis block. A second block 500_2 may be connected to the first block 500_1. In an embodiment, the second block 500_2 may be connected to the first block 500_1 by including a hash value of the first block 500_1. Similarly, a third block (not shown) may be connected to the second block 500_2, and the $M^{th}$ block 500_M may be connected to an $(M-1)^{th}$ block (not shown).

Referring to FIG. 1, the block chain data BC_Data may be shared with participants of the block chain system 10. In other words, each of the first to the $N^{th}$ participants 300_1 to 300_N may store the block chain data BC_Data. A new block may be chained to the block chain data BC_Data. In an embodiment, a new block generator transmits a chaining request message of a new block to participants, and the participants verify the new block, so that only the verified new block may be chained to the block chain data BC_Data.

Figure 2B:
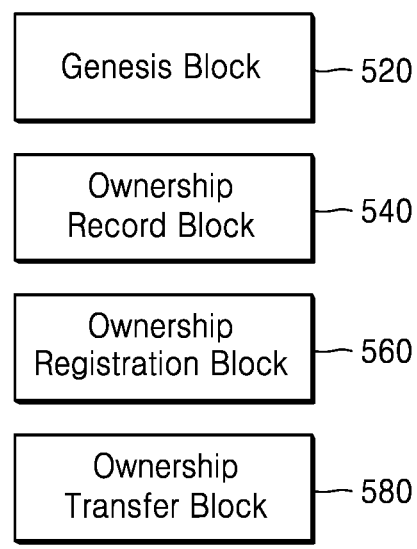
FIG. 2B illustrates types of data blocks according to an example embodiment.

FIG. 2B is a view illustrating types of data blocks according to an example embodiment. A data block may include a genesis block 520, an ownership record block 540, an ownership registration block 560, and an ownership transfer block 580. However, these are merely examples and the disclosure is not limited thereto.

Referring to FIG. 2A, the genesis block 520 may be a block that is a root of the block chain data BC_Data. In an embodiment, the genesis block 520 may be generated by a manufacturer (or a manufacturer apparatus). The genesis block 520 and a generation process of the genesis block 520 will be described in more detail with reference to FIGS. 3 and 4.

The ownership record block 540 may be a block for initially recording product ownership in a block chain. In an embodiment, the ownership record block 540 may be generated by a manufacturer (or a manufacturer apparatus) and may be chained to a block chain by the manufacturer requesting chaining to participants of a block chain system. The ownership record block 540 and a generation process of the ownership record block 540 will be described in more detail with reference to FIGS. 5 and 6.

The ownership registration block 560 may be a block for initially registering product ownership in a block chain. In an embodiment, the ownership registration block 560 may be generated by a user apparatus and may be chained to a block chain by the user apparatus requesting chaining to participants of a block chain system. For example, the user may be a genesis purchaser (or an initial purchaser) of the product. The ownership registration block 560 and a generation process of the ownership registration block 560 will be described in more detail with reference to FIGS. 9, 10, 11A, and 11B.

The ownership transfer block 580 may be a block for storing information about product ownership transfer in a block chain, either in a process of transferring a product from a transferor to a transferee, or after the transferring. In an embodiment, the ownership transfer block 580 may be generated by a user apparatus and may be chained to a block chain by the user apparatus requesting chaining to participants of a block chain system. For example, the user may be a transferee of the product. The ownership transfer block 580 and a process of generating the ownership transfer block 580 will be described in more detail with reference to FIGS. 13, 14A, and 14B.

Referring to FIG. 2A, at least a portion of the second block 500_2 to the $M^{th}$ block 500_M may be one of the ownership record block 540, the ownership registration block 560, and the ownership transfer block 580.

Figure 3:
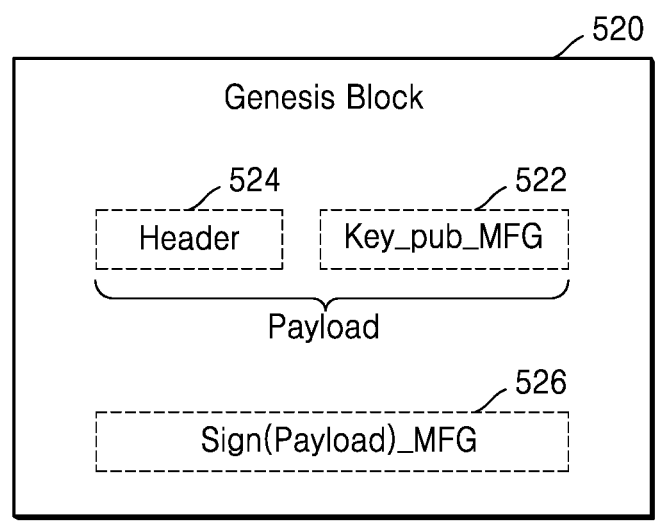
FIG. 3 is a view illustrating a configuration of a genesis block according to an example embodiment.

FIG. 3 is a view illustrating a configuration of the genesis block 520 according to an example embodiment. FIG. 3 will be described with reference to FIG. 1.

The genesis block 520 may include a public key 522 of the manufacturer 400. In an embodiment, the genesis block 520 may include a header 524 and the public key 522 of the manufacturer 400. In an embodiment, the genesis block 520 may include a payload including the header 524 and the public key 522 of the manufacturer 400. In an embodiment, the genesis block 520 may include a signature 526 of the manufacturer 400 for the payload. The signature 526 may be a digital signature. The manufacturer 400 may generate a digital signature for the payload by encrypting a digest value of the payload (e.g., a hash value of the payload) using a secret key of the manufacturer 400.

Similar to the genesis block 520 described above, data blocks other than the genesis block 520 may include the payload and a signature for the payload, wherein the signature for the payload may be referred to as an additional signature included in a data block.

In an embodiment, the genesis block 520 may be generated by the manufacturer 400, which will be described in more detail with reference to FIG. 4.

Figure 4:
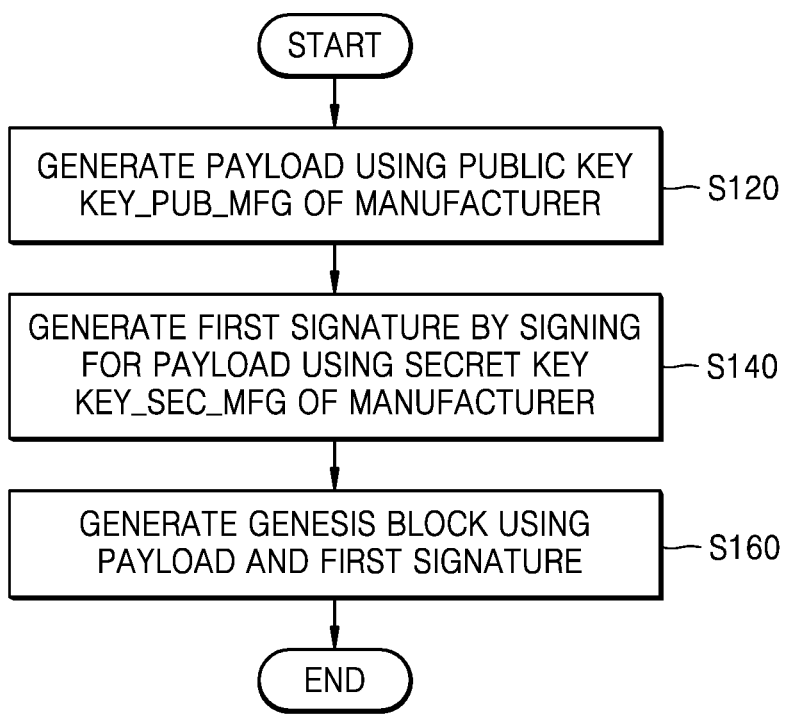
FIG. 4 is a flowchart of a method of generating a genesis block according to an example embodiment.

FIG. 4 is a flowchart of a method of generating a genesis block according to an example embodiment. In an embodiment, the genesis block may be generated by a manufacturer. FIG. 4 will be described with reference to FIG. 1.

In operation S120, the manufacturer 400 may generate a payload using a public key Key_pub_MFG of the manufacturer 400. For example, the manufacturer 400 may generate a payload using the public key Key_pub_MFG of the manufacturer 400 and a header.

In operation S140, the manufacturer 400 may generate a first signature by signing for the payload using a secret key Key_sec_MFG of the manufacturer 400. Here, the first signature may be an additional signature of the manufacturer 400.

In operation S160, the manufacturer 400 may generate a genesis block using the payload and the first signature.

Figure 5:
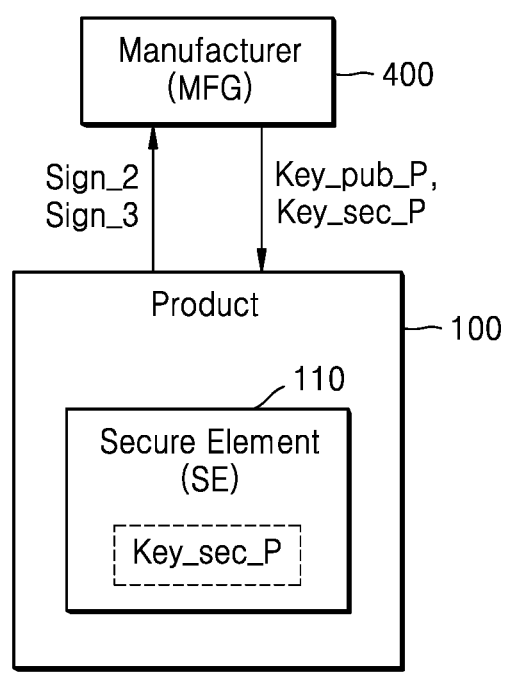
FIG. 5 is a view of a product and a manufacturer according to an example embodiment.

FIG. 5 is a view of the product 100 and the manufacturer 400 according to an example embodiment. FIG. 5 shows only the product 100 and the manufacturer 400 of FIG. 1 to explain a process of generating an ownership record block for the product 100 of the manufacturer 400. Repeated descriptions of the product 100 and the manufacturer 400 of FIG. 5, which are similar or the same as those of FIG. 1, will not be given herein.

The manufacturer 400 may generate a public key Key_pub_P and a secret key Key_sec_P of the product 100 before the product 100 is produced and sold. The manufacturer 400 may provide the public key Key_pub_P and the secret key Key_sec_P of the generated product 100 to the product 100. The secret key may be referred to as a private key. The manufacturer 400 may request a second signature Sign_2 of the product 100 for warranty information of the product 100 and a third signature Sign_3 of the product 100 for a payload to be included in an ownership record block and receive the second signature Sign_2 and the third signature Sign_3 from the product 100. Each of the second signature Sign_2 and the third signature Sign_3 may be an electronic signature of the product 100 using the secret key Key_sec_P of the product 100.

The product 100 may include a secure element 110. The secure element 110 may represent a space in which data requiring security is stored in an environment in which unauthorized access from outside is impossible. The secure element 110 may store the secret key Key_sec_P of the product 100. In an embodiment, in response to a signature request for the warranty information of the product 100 received from the manufacturer 400, the product 100 may transmit the second signature Sign_2 generated by the secure element 110 to the manufacturer 400 by using the secret key Key_sec_P of the product 100. Also, in an embodiment, in response to a signature request for a payload received from the manufacturer 400, the product 100 may transmit the third signature Sign_3 generated by the secure element 110 to the manufacturer 400 by using the secret key Key_sec_P of the product 100.

Figure 6:
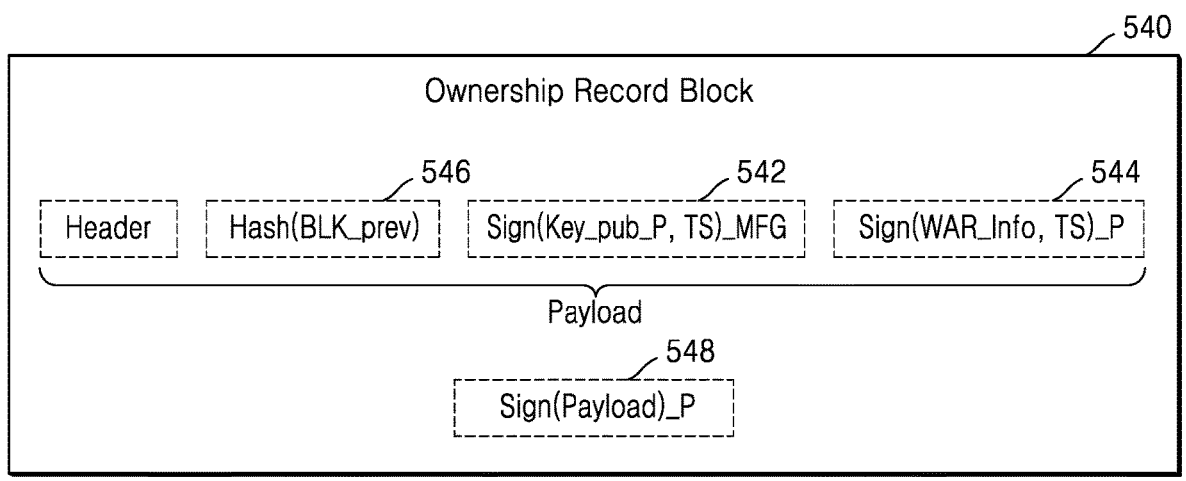
FIG. 6 is a view illustrating a configuration of an ownership record block according to an example embodiment.

FIG. 6 is a view illustrating a configuration of the ownership record block 540 according to an example embodiment. FIG. 6 will be described with reference to FIG. 5.

The ownership record block 540 may include a first signature 542 of the manufacturer 400 for the public key Key_pub_P of the product 100 and a second signature 544 of the product 100 for warranty information WAR_Info of the product 100. In an embodiment, the first signature 542 may be a signature of the manufacturer 400 for a first message including the public key Key_pub_P of the product 100 and a time stamp TS, and the second signature 544 may be a signature of the product 100 for a second message including the warranty information WAR_Info and the time stamp TS of the product 100. In an embodiment, the ownership record block 540 may include a payload including the first signature 542 and the second signature 544, and the payload may include a header and a hash value 546 of a previous block. The previous block may be a data block to which the generated ownership record block 540 is directly chained, as a last data block included in block chain data at a point in time when the manufacturer 400 generates the ownership record block 540. Furthermore, in an embodiment, the ownership record block 540 may include a third signature 548 of the product 100 for a payload. The third signature 548 may be referred to as an additional signature of the ownership record block 540. A process of generating the ownership record block 540 will be described in more detail with reference to FIG. 7.

Figure 7:
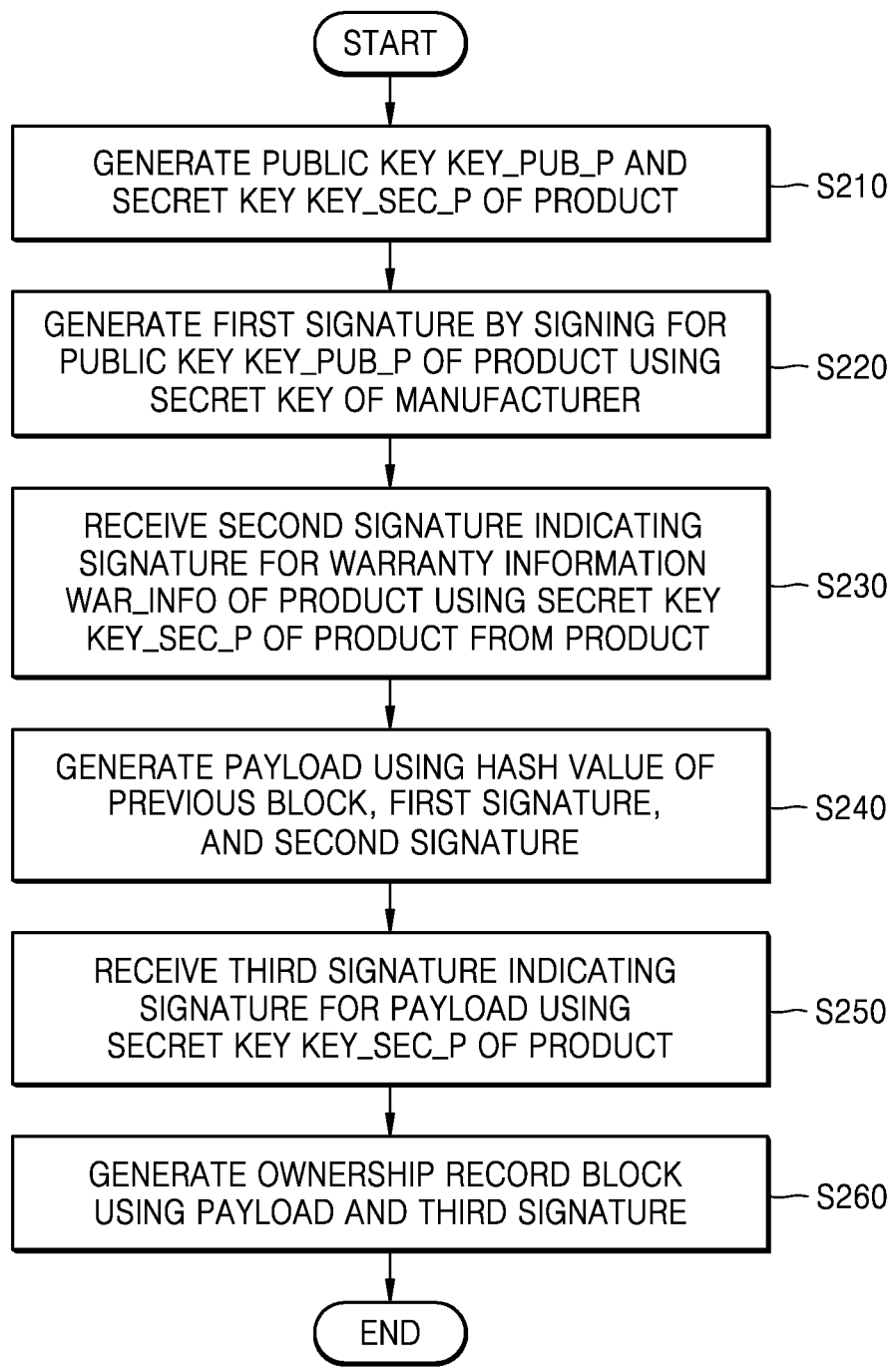
FIG. 7 is a flowchart of a method of generating an ownership record block, according to an example embodiment.

FIG. 7 is a flowchart of a method of generating an ownership record block, according to an example embodiment. In an embodiment, the ownership record block may be generated by a manufacturer. FIG. 7 will be described with reference to FIG. 5.

In operation S210, the manufacturer 400 may generate the public key Key_pub_P and the secret key Key_sec_P of the product 100. The manufacturer 400 may inject the public key Key_pub_P and the secret key Key_sec_P of the generated product 100 into the product 100.

In operation S220, the manufacturer 400 may generate a first signature by signing for the public key Key_pub_P of the product 100 using the secret key Key_sec_MFG of the manufacturer 400. In an embodiment, the manufacturer 400 may generate the first signature by signing for a first message including the public key Key_pub_P of the product 100 and a time stamp by using the secret key Key_sec_MFG of the manufacturer 400.

In operation S230, the manufacturer 400 may receive a second signature indicating a signature for the warranty information WAR_Info of the product 100 using the secret key Key_sec_P of the product 100 from the product 100. In an embodiment, the second signature may be generated in a secure element of the product 100. Also, in an embodiment, the second signature may be a signature for a second message including the warranty information WAR_Info and the time stamp of the product 100 using the secret key Key_sec_P of the product 100.

In operation S240, the manufacturer 400 may generate a payload using a hash value of the previous block, the first signature, and the second signature. In an embodiment, the manufacturer 400 may generate a payload using a header, the hash value of the previous block, the first signature, and the second signature.

In operation S250, the manufacturer 400 may receive a third signature indicating a signature for the payload using the secret key Key_sec_P of the product 100.

In operation S260, the manufacturer 400 may generate an ownership record block using the payload and the third signature.

The manufacturer 400 may generate the ownership record block and then transmit a chaining request message to participants of a block chain system to chain the ownership record block to a block chain as a new block. When the ownership record block is verified by the participants, the ownership record block may be chained to the block chain.

Figure 8:
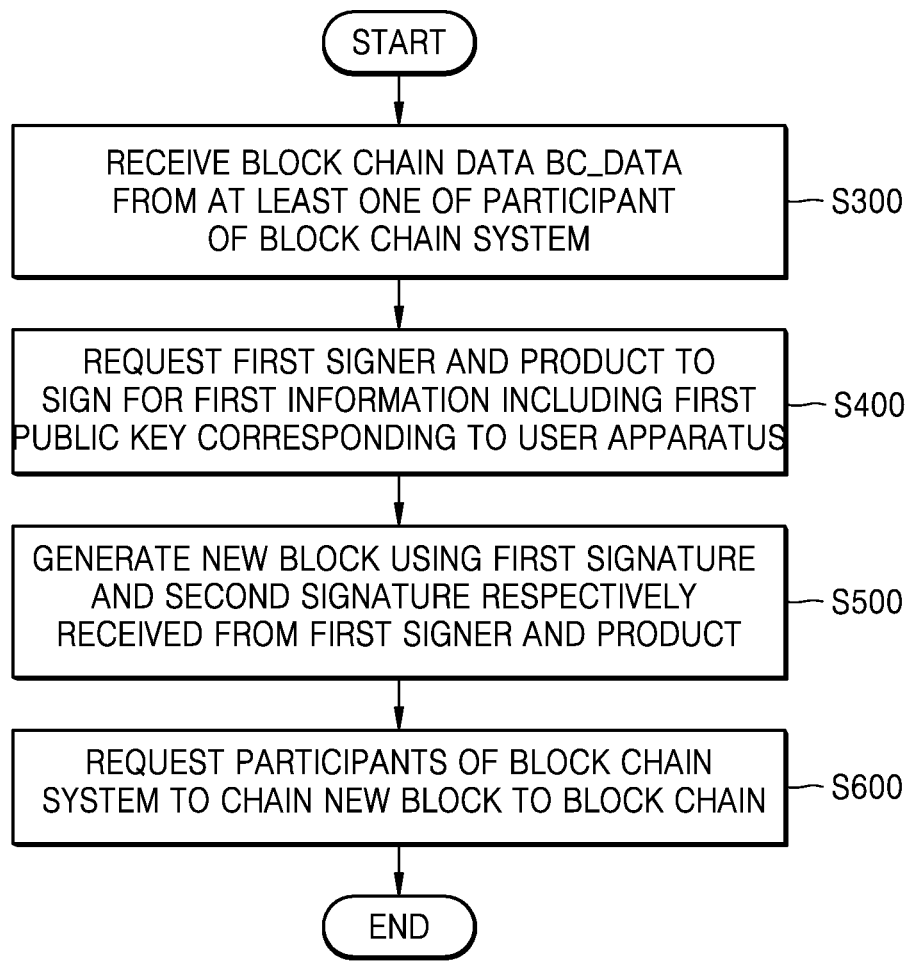
FIG. 8 is a flowchart of a method of managing product information in a user apparatus, according to an example embodiment.

FIG. 8 is a flowchart of a method of managing product information in a user apparatus, according to an example embodiment. FIG. 8 will be described with reference to FIG. 1.

In operation S300, the user apparatus 200 may receive the block chain data BC_Data from at least one of participants of the block chain system 10. For example, the user apparatus 200 may receive the block chain data BC_Data from the nearest participant in a position among the first participant 300_1 to the N$^{th}$ participant 300_N through the second network 250.

In operation S400, the user apparatus 200 may request a first signer and the product 100 to respectively sign for first information including a first public key corresponding to the user apparatus 200. The first signer may be the manufacturer 400 or another user apparatus.

In operation S500, the user apparatus 200 may generate a new block using the first signature and the second signature respectively received from the first signer and the product 100. For example, the user apparatus 200 may generate a payload including the first signature and the second signature and may generate a new block by using a third signature for the payload using a secret key corresponding to the user apparatus 200 and the payload.

In operation S600, the user apparatus 200 may request participants of the block chain system 10 to chain the generated new block to a block chain. For example, the user apparatus 200 may request chaining the new block to the block chain by transmitting a chaining request message including the new block to participants of the block chain system 10. When the new block is verified by the participants, the new block may be chained to the block chain.

In an embodiment, the product information management method of FIG. 8 may be applied to generation of ownership registration block and ownership transfer block in the user apparatus 200. The ownership registration block generation of the user apparatus 200 will be described in more detail with reference to FIGS. 9 to 11B, and the ownership transfer block generation of the user apparatus 200 will be described in more detail with reference to FIGS. 12 to 14B.

According to the block chain system 10 according to an example embodiment, by using a block chain to manage product information, a manufacturer may obviate a need to have a separate authentication server, which reduces maintenance cost, enhances security, and allows for transparent tracking of an ownership transfer path.

Figure 9:
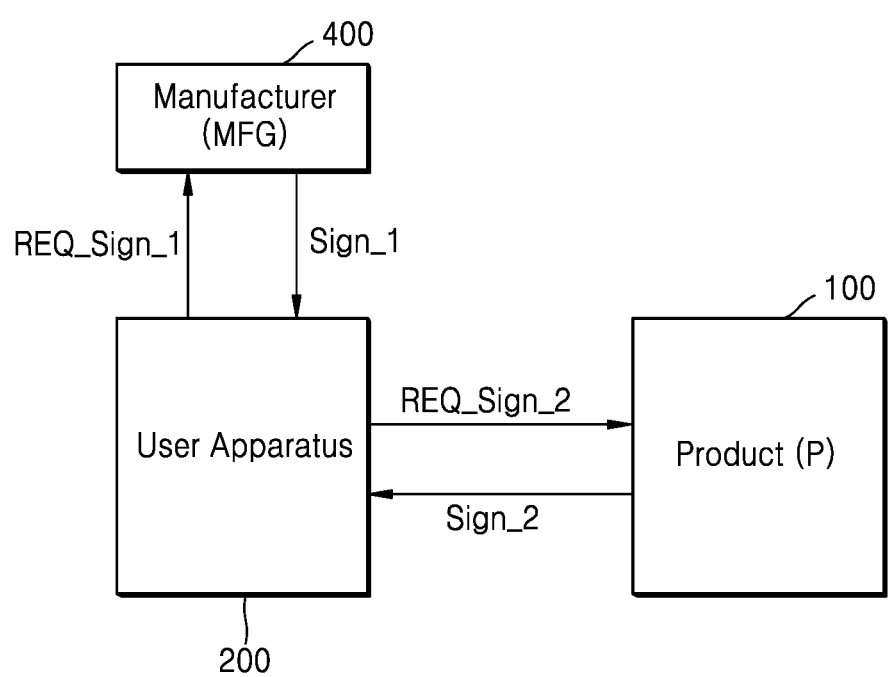
FIG. 9 is a view of a product, a user apparatus, and a manufacturer according to an example embodiment.

FIG. 9 shows the product 100, the user apparatus 200, and the manufacturer 400 according to an example embodiment. FIG. 9 shows only the product 100, the user apparatus 200, and the manufacturer 400 of FIG. 1 to explain a process of generating an ownership registration block of the user apparatus 200. Repeated descriptions of the product 100, the user apparatus 200, and the manufacturer 400 of FIG. 5, which are similar or the same as those of FIG. 1, will not be given herein.

The user apparatus 200 may be a computing device of a user who wishes to register the product 100 in a block chain. For example, the user apparatus 200 may be a computing device of a user who is to initially purchase and use the product 100. The user apparatus 200 may generate a secret key and a public key corresponding to the user apparatus 200. For example, the user apparatus 200 may generate a user's private key and a user's public key. The user apparatus 200 may request a first signature Sign_1 of the manufacturer 400 for the user's public key by transmitting a first signature request signal REQ_Sign_1 to the manufacturer 400, and the second signature Sign_2 of the product 100 for the user's public key by transmitting a second signature request signal REQ_Sign_2 to the product 100. The user apparatus 200 may receive the first signature Sign_1 from the manufacturer 400 in response to the first signature request signal REQ_Sign_1 and may receive the second signature Sign_2 from the product 100 in response to the second signature request signal REQ_Sign_2.

The user apparatus 200 may generate an ownership registration block by using the first signature Sign_1 and the second signature Sign_2. A configuration of the ownership registration block will be described in more detail with reference to FIG. 10.

Figure 10:
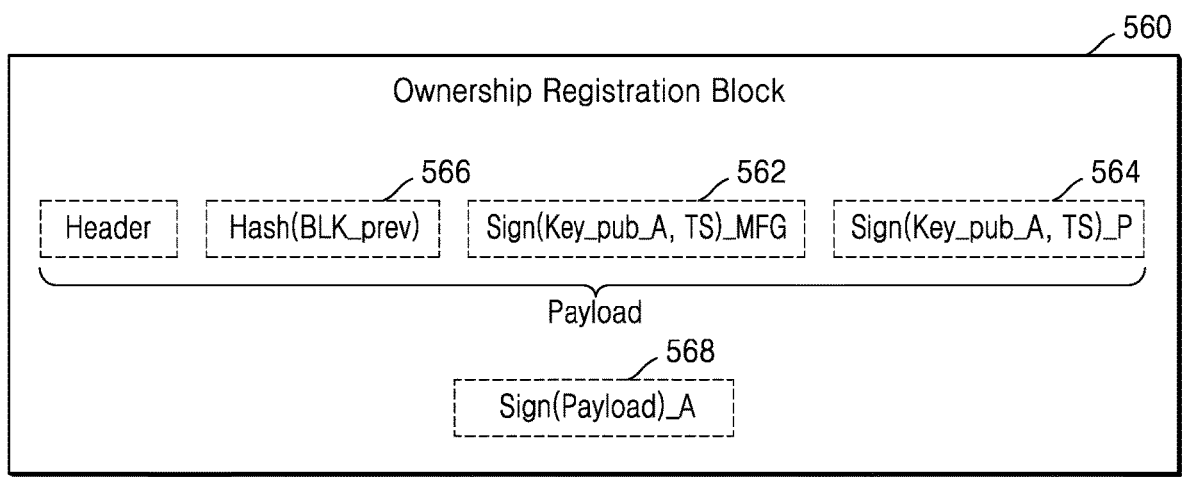
FIG. 10 is a view illustrating a configuration of an ownership registration block according to an example embodiment.

FIG. 10 is a view illustrating a configuration of the ownership registration block 560 according to an example embodiment. FIG. 10 is described with reference to FIG. 9, assuming that a user of the user apparatus 200 is user A.

The ownership registration block 560 may include a first signature 562 of the manufacturer 400 for a public key Key_pub_A of user A and a second signature 564 of the product 100 for the public key Key_pub_A of user A. In an embodiment, the first signature 562 may be a signature of the manufacturer 400 for a first message including the public key Key_pub_A of user A and the time stamp TS, and the second signature 564 may be a signature of the product 100 for a second message including the public key Key_pub_A of user A and the time stamp TS. In an embodiment, the ownership registration block 560 may include a payload including the first signature 562 and the second signature 564, and the payload may include a header and a hash value 546 of a previous block. Furthermore, in an embodiment, the ownership registration block 560 may include a third signature 568 using a secret key of user A for the payload. The third signature 568 may be referred to as an additional signature of the ownership registration block 560. A process of generating the ownership registration block 560 will be described in more detail with reference to FIGS. 11A and 11B.

Figure 11A:
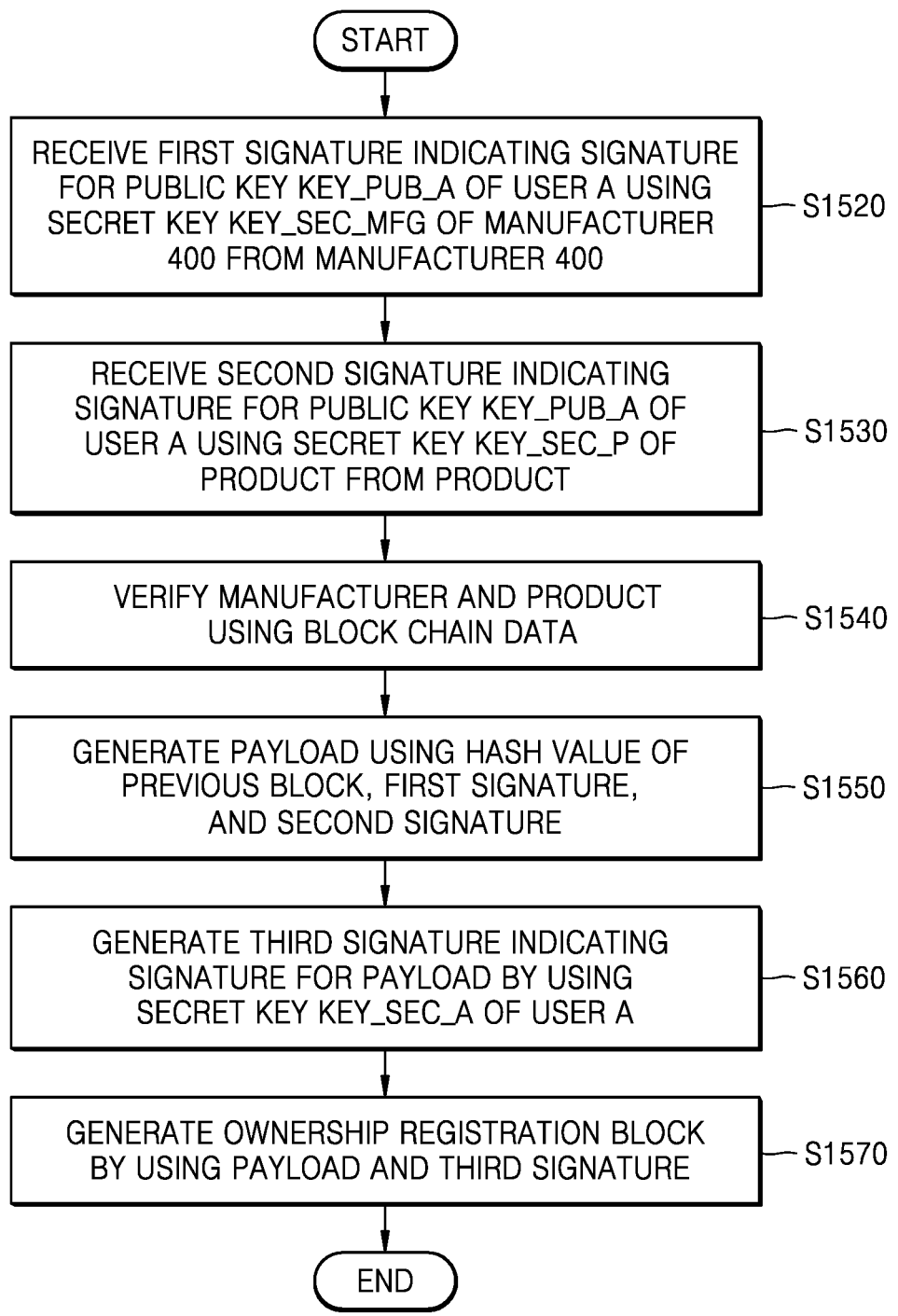
FIGS. 11A and 11B are flowcharts of a method of generating an ownership registration block, according to an example embodiment.
Figure 11B:
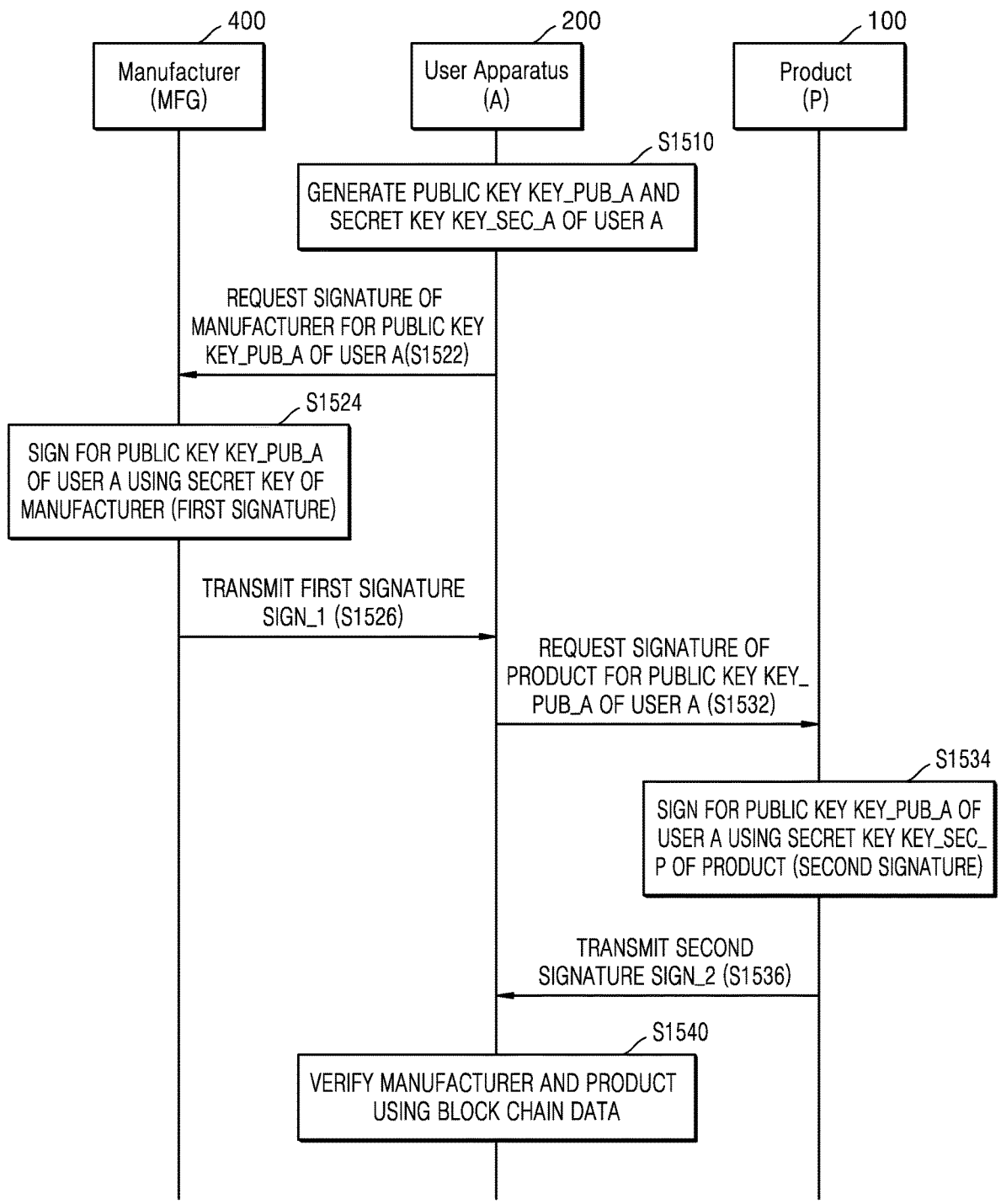

FIGS. 11A and 11B are flowcharts of a method of generating an ownership registration block, according to an example embodiment. FIG. 11A may show an embodiment of operation S500 described in FIG. 8 when the method of FIG. 8 is applied to the generation of an ownership registration block, and FIG. 11B may show an embodiment of operations of generating the ownership registration block up to operation S1540 of FIG. 11A. FIGS. 11A and 11B will be described with reference to FIG. 9.

Referring to FIG. 11A, in operation S1520, the user apparatus 200 may receive the first signature Sign_1 indicating a signature for the public key Key_pub_A of user A using the secret key Key_sec_MFG of the manufacturer 400 from the manufacturer 400. In an embodiment, the first signature Sign_1 may be a signature of the manufacturer 400 for a first message including the public key Key_pub_A and the time stamp TS of user A.

In operation S1530, the user apparatus 200 may receive the second signature Sign_2 indicating a signature for the public key Key_pub_A of user A using the secret key Key_sec_P of the product 100 from the product 100. In an embodiment, the second signature Sign_2 may be a signature of the product 100 for the second message including the public key Key_pub_A and the time stamp TS of user A, and the second signature Sign_2 may be generated in the secure element of the product 100.

In operation S1540, the user apparatus 200 may verify the manufacturer 400 and the product 100 that are signers of the first signature Sign_1 and the second signature Sign_2 by using block chain data. A process of verifying a specific target such as the manufacturer 400 or the product 100 will be described with reference to FIGS. 15 to 16B.

In operation S1550, when the verification for the manufacturer 400 and the product 100 is completed, the user apparatus 200 may generate a payload by using a hash value of the previous block, the first signature Sign_1, and the second signature Sign_2. In an embodiment, the payload may further include a header.

In operation S1560, the user apparatus 200 may generate a third signature indicating a signature for the payload by using a secret key Key_sec_A of user A. The third signature may be referred to as an additional signature of a user registration block.

In operation S1570, the user apparatus 200 may generate an ownership registration block by using the payload and the third signature.

The user apparatus 200 may generate the ownership registration block and then transmit a chaining request message to participants of the block chain system to chain the ownership registration block to the block chain as a new block. When the ownership registration block is verified by the participants, the ownership registration block may be chained to the block chain. A process of chaining the new block will be described with reference to FIGS. 17 to 19C.

Referring to FIG. 11B, in operation S1510, the user apparatus 200 may generate the public key Key_pub_A and the secret key Key_sec_A of user A.

Operations S1522, S1524, and S1526 may correspond to operation S1520 in FIG. 11A. In operation S1522, the user apparatus 200 may request the signature of the manufacturer 400 for the public key Key_pub_A of user A. In operation S1524, the manufacturer 400 may generate the first signature Sign_1 by signing for the public key Key_pub_A of user A using the secret key Key_sec_MFG of the manufacturer 400. In operation S1526, the manufacturer 400 may transmit the first signature Sign_1 to the user apparatus 200.

Operations S1532, S1534, and S1536 may correspond to operation S1530 in FIG. 11A. In operation S1532, the user apparatus 200 may request a signature of the product 100 for the public key Key_pub_A of user A. In operation S1534, the product 100 may generate the second signature Sign_2 by signing for the public key Key_pub_A of user A using the secret key Key_sec_P of the product 100. In operation S1536, the product 100 may transmit the second signature Sign_2 to the user apparatus 200.

In operation S1540, the user apparatus 200 may verify the manufacturer 400 and the product 100 that are signers of the first signature Sign_1 and the second signature Sign_2 by using the block chain data.

Figure 12A:
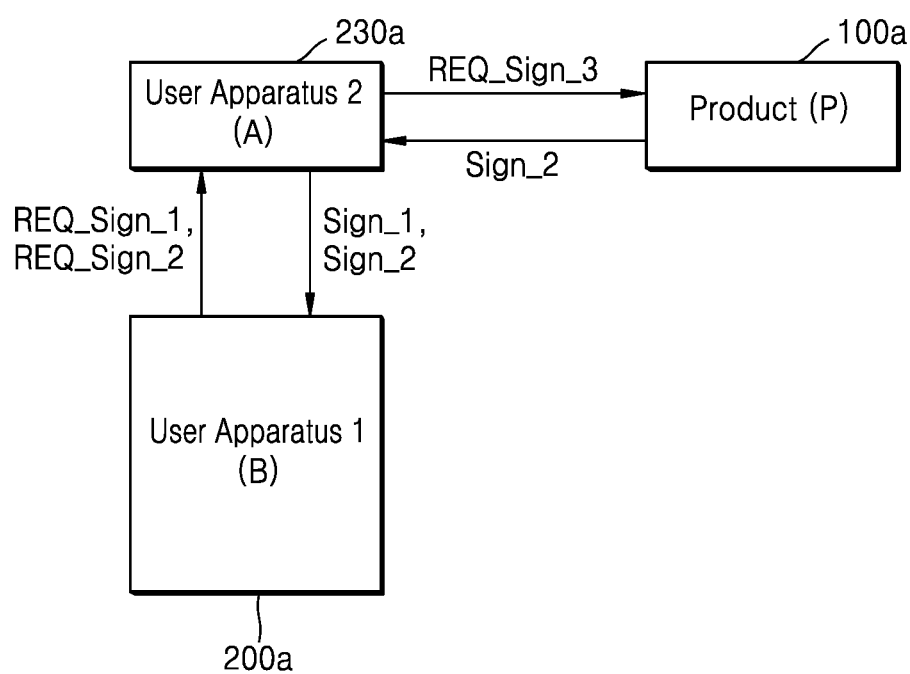
FIGS. 12A and 12B are views of a product, a first user apparatus, and a second user apparatus according to an example embodiment.
Figure 12B:
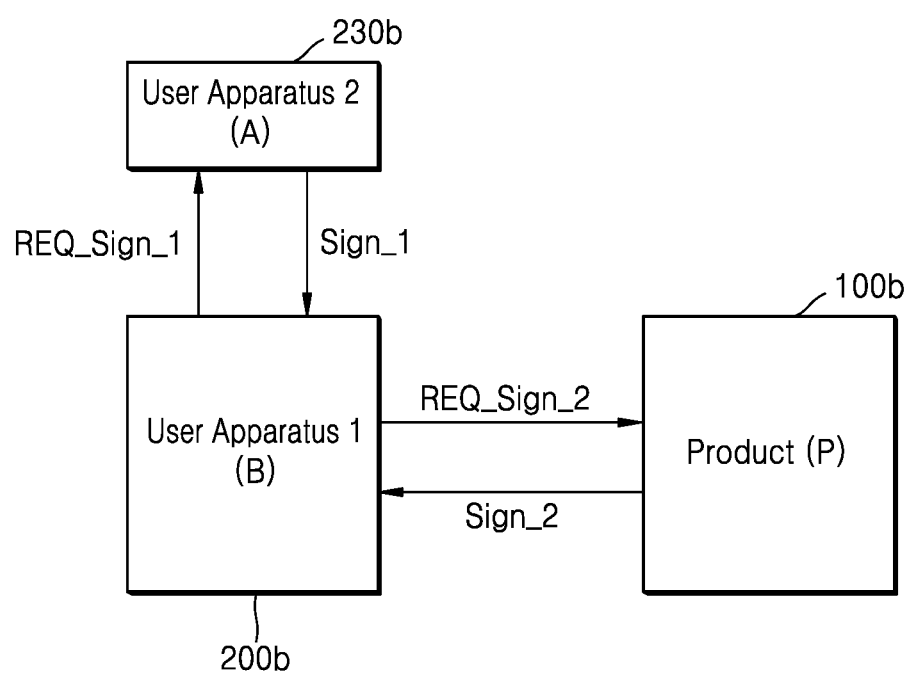

FIGS. 12A and 12B are views illustrating, respectively, products 100a and 100b, first user apparatuses 200a and 200b, and second user apparatuses 230a and 230b according to an example embodiment. FIGS. 12A and 12B show the products 100a and 100b, the first user apparatuses 200a and 200b, and the second user apparatuses 230a and 230b to explain a process of generating an ownership transfer block of the first user apparatuses 200a and 200b. Repeated descriptions of the product 100 of FIGS. 12A and 12B, which are similar or the same as those of FIG. 1, will not be given herein.

The first user apparatuses 200a and 200b may be a computing device of a transferee of the products 100a and 100b and the second user apparatuses 230a and 230b may be a computing device of a transferor of the products 100a and 100b. It is assumed that the transferor is user A and the transferee is user B.

FIG. 12A shows an embodiment in which a transferee uses the first user apparatus 200a to generate an ownership transfer block before receiving the product 100a from a transferor.

The first user apparatus 200a may generate a secret key and a public key corresponding to the first user apparatus 200a. For example, the first user apparatus 200a may generate a public key of the transferee, that is, a public key of user B. The first user apparatus 200a may request the first signature Sign_1 of the second user apparatus 230a for the public key of user B by transmitting the first signature request signal REQ_Sign_1 to the second user apparatus 230a, and the second signature Sign_2 of the product 100a for the public key of user B by transmitting the second signature request signal REQ_Sign_2 to the second user apparatus 230a.

In response to the second signature request signal REQ_Sign_2, the second user apparatus 230a may request the second signature Sign_2 of the product 100a for the public key of user B by transmitting the third signature request signal REQ_Sign_3 to the product 100a. The second user apparatus 230a may receive the second signature Sign_2 from the product 100a in response to the third signature request signal REQ_Sign_3. The second user apparatus 230a may transmit the first signature Sign_1 and the second signature Sign_2 to the first user apparatus 200a.

The first user apparatus 200a may generate an ownership transfer block by using the first signature Sign_1 and the second signature Sign_2. A configuration of the ownership transfer block will be described in more detail with reference to FIG. 13.

FIG. 12B shows an embodiment in which a transferee uses the first user apparatus 200b to generate an ownership transfer block after receiving the product 100b from a transferor. The first user apparatus 200b may generate a secret key and a public key corresponding to the first user apparatus 200b. For example, the first user apparatus 200b may generate a secret key and a public key of user B. The first user apparatus 200b may request the first signature Sign_1 of the second user apparatus 230b for the public key of user B by transmitting the first signature request signal REQ_Sign_1 to the second user apparatus 230b, and the second signature Sign_2 of the product 100b for the public key of user B by transmitting the second signature request signal REQ_Sign_2 to the product 100b. The user apparatus 200 may receive the first signature Sign_1 from the second user apparatus 230b in response to the first signature request signal REQ_Sign_1 and may receive the second signature Sign_2 from the product 100b in response to the second signature request signal REQ_Sign_2.

The first user apparatus 200b may generate an ownership transfer block by using the first signature Sign_1 and the second signature Sign_2. A configuration of the ownership transfer block will be described in more detail with reference to FIG. 13.

Figure 13:
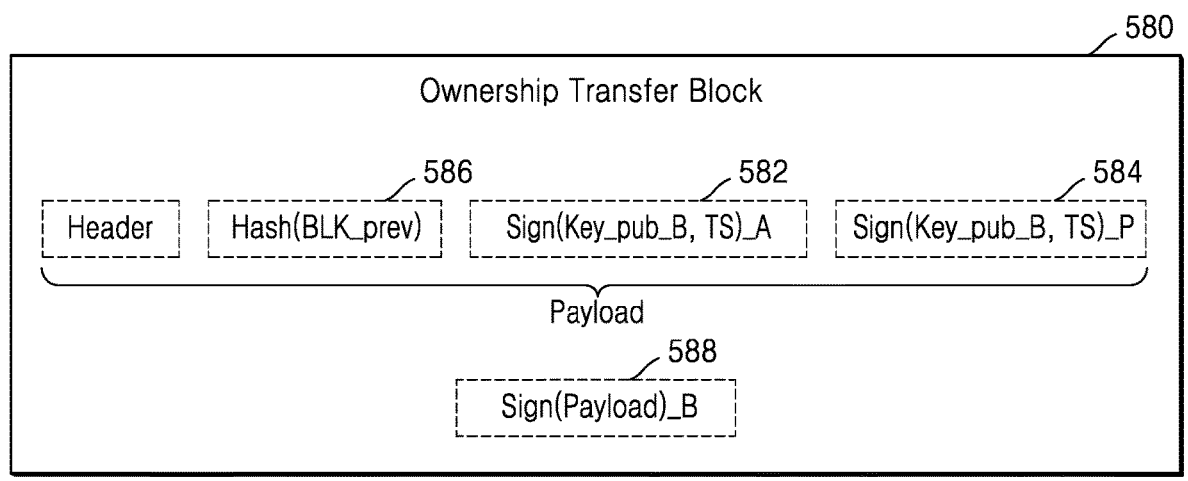
FIG. 13 is a view illustrating a configuration of an ownership transfer block according to an example embodiment.

FIG. 13 is a view illustrating a configuration of the ownership transfer block 580 according to an example embodiment. FIG. 13 will be described with reference to FIGS. 12A and 12B.

The ownership transfer block 580 may include the first signature 582 of the second user apparatus 230 for the public key Key_pub_B of user B and the second signature 584 of the product 100 for the public key Key_pub_B of user B. In an embodiment, the first signature 582 may be a signature of the second user apparatus 230 for a first message including the public key Key_pub_B of user B and the time stamp TS, and the second signature 584 may be a signature of the product 100 for a second message including the public key Key_pub_B of user B and the time stamp TS. In an embodiment, the ownership transfer block 580 may include a payload including the first signature 582 and the second signature 584, and the payload may include a header and a hash value 546 of a previous block. Furthermore, in an embodiment, the ownership transfer block 580 may include a third signature 588 using a secret key of user B for the payload. The third signature 588 may be referred to as an additional signature of the ownership transfer block 580. A process of generating the ownership transfer block 580 will be described in more detail with reference to FIGS. 14A to 14C.

Figure 14A:
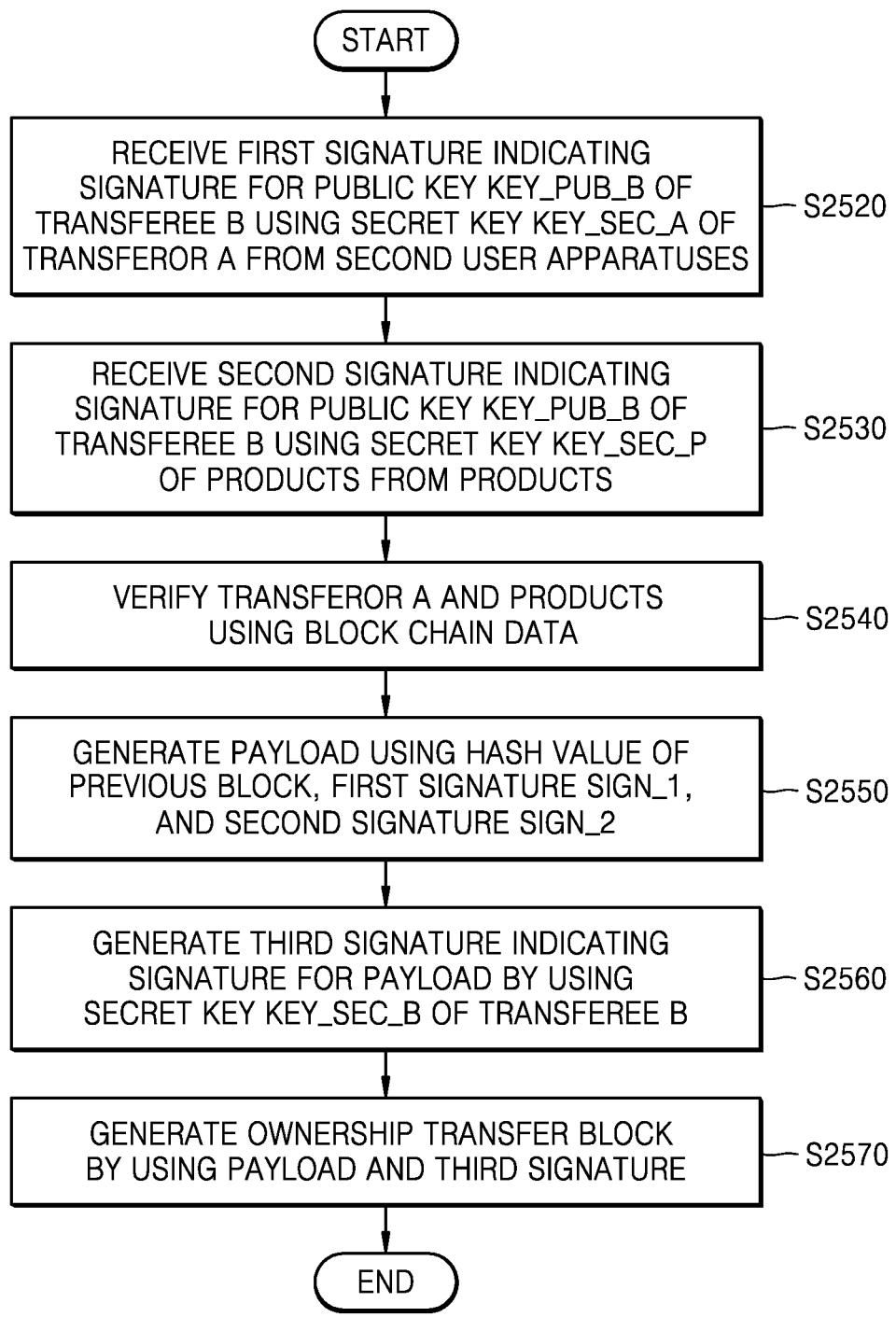
FIGS. 14A to 14C are flowcharts of a method of generating an ownership transfer block, according to an example embodiment.
Figure 14B:
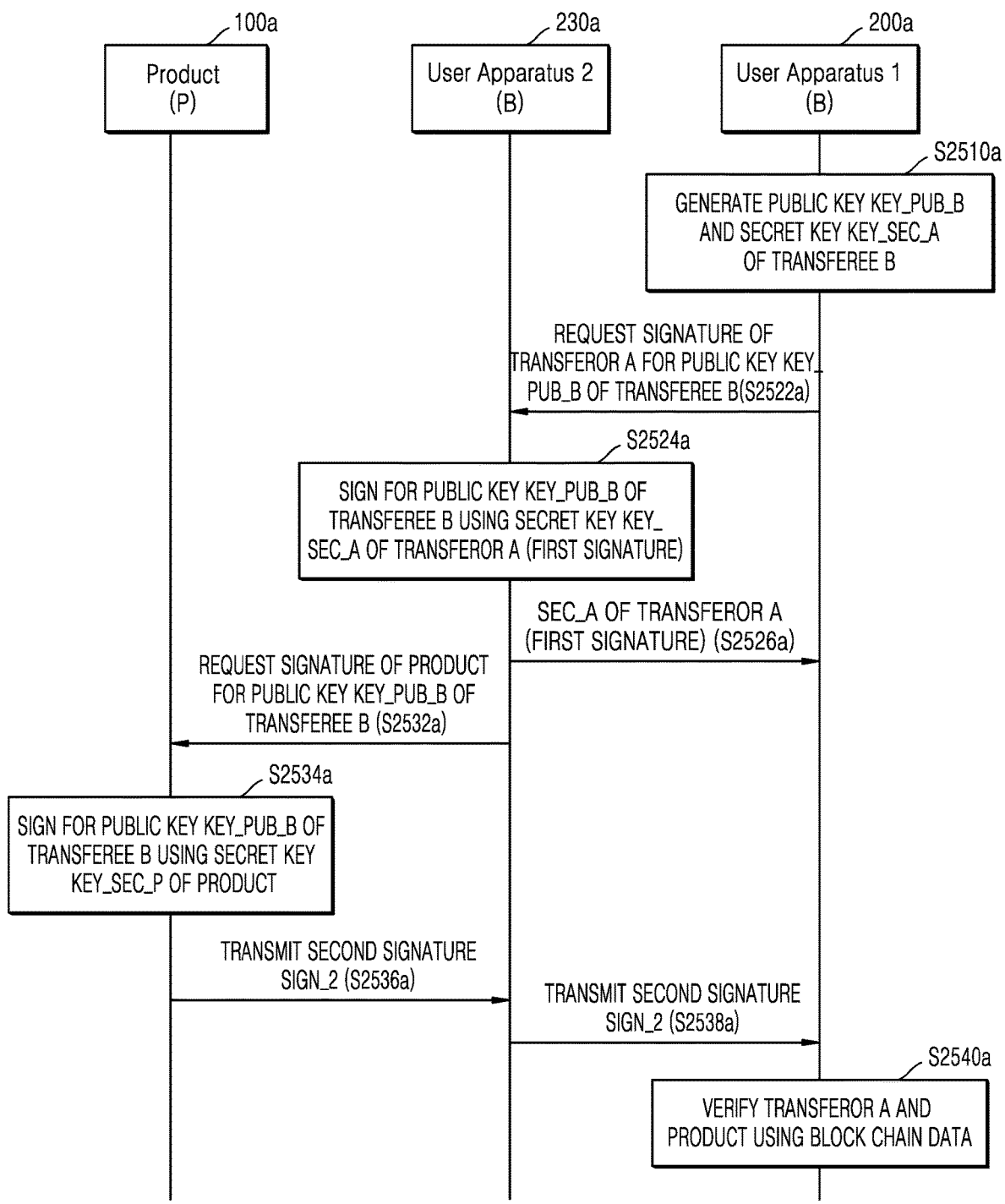
Figure 14C:
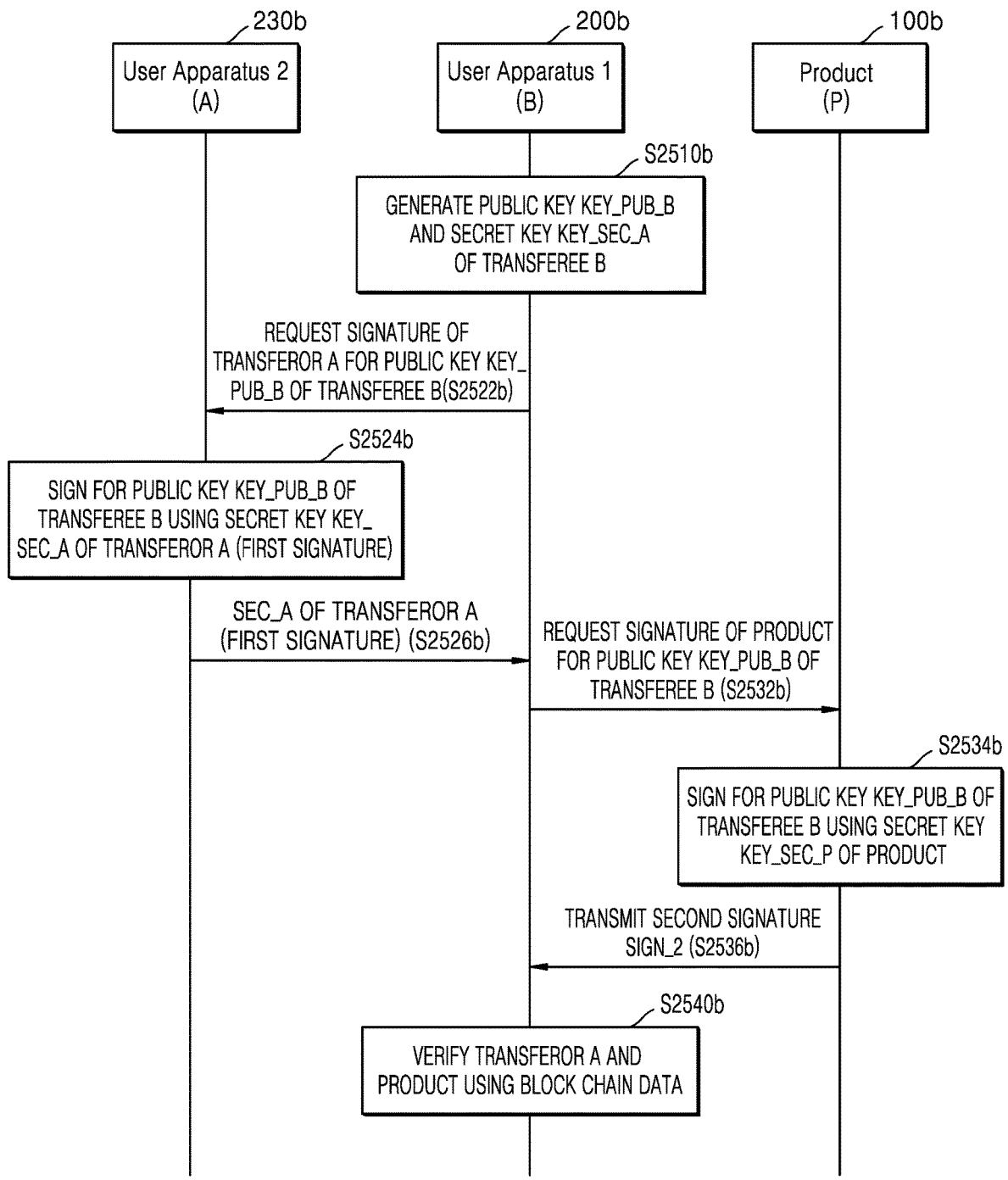

FIGS. 14A to 14C are flowcharts of a method of generating an ownership transfer block, according to an example embodiment. FIG. 14A may show an embodiment of operation S500 of FIG. 8 when the method of FIG. 8 is applied to the generation of an ownership transfer block, FIG. 14B may show an embodiment up to operation S2540 of FIG. 14A according to the system of FIG. 12A, and FIG. 14C may show an implementation of generating an ownership transfer block up to operation S2540 of FIG. 14A according to the system of FIG. 12B. FIG. 14A will be described with reference to FIGS. 12A and 12B, FIG. 14B will be described with reference to FIG. 12A, and FIG. 14C will be described with reference to FIG. 12B. User A is described as being transferor A and user B is described as being transferee B.

Referring to FIG. 14A, in operation S2520, the first user apparatuses 200a and 200b may receive the first signature Sign_1 indicating a signature for the public key Key_pub_B of transferee B using the secret key Key_sec_A of the transferor A from the second user apparatuses 230a and 230b, respectively. In an embodiment, the first signature Sign_1 may be a signature of the transferor A for a first message including the public key Key_pub_B and the time stamp TS of the transferee B.

In operation S2530, the first user apparatuses 200a and 200b may receive the second signature Sign_2 indicating the signature for the public key Key_pub_B of the transferee B using the secret key Key_sec_P of the products 100a and 100b from the products 100a and 100b, respectively. In an embodiment, the second signature Sign_2 may be a signature of the products 100a and 100b for the second message including the public key Key_pub_B and the time stamp TS of the transferee B, and the second signature Sign_2 may be generated in a secure element of the products 100a and 100b.

In operation S2540, the first user apparatuses 200a and 200b may verify the transferor A and the products 100a and 100b that are signers of the first signature Sign_1 and the second signature Sign_2 using block chain data, respectively. A process of verifying a specific target such as the transferor A or the products 100a and 100b will be described with reference to FIGS. 15 to 16B.

In operation S2550, when the verification for the transferor A and the products 100a and 100b are completed, the first user apparatuses 200a and 200b may generate a payload using a hash value of a previous block, the first signature Sign_1, and the second signature Sign_2. In an embodiment, the payload may further include a header.

In operation S2560, the first user apparatuses 200a and 200b may generate a third signature indicating a signature for the payload by using a secret key Key_sec_B of the transferee B. The third signature may be referred to as an additional signature of a user transfer block.

In operation S2570, the first user apparatuses 200a and 200b may generate an ownership transfer block by using the payload and the third signature.

The first user apparatuses 200a and 200b may generate the ownership transfer block and then transmit a chaining request message to participants of a block chain system to chain the transfer registration block to the block chain as a new block. When the ownership transfer block is verified by the participants, the ownership transfer block may be chained to the block chain. After the ownership transfer block is normally chained to the block chain, the transferee B may pay to the transferor A for the products 100a and 100b. A process of chaining the new block will be described with reference to FIGS. 17 to 19C.

Referring to FIG. 14B, in operation S2510a, the first user apparatus 200a may generate the public key Key_pub_B and the secret key Key_sec_B of the transferee B.

Operations S2522a, S2524a, and S2526a may correspond to operation S2520 in FIG. 14A. In operation S2522, the first user apparatus 200a may request the signature of the transferor A for the public key Key_pub_B of the transferee B. In operation S2524a, the second user apparatus 230a of the transferor A may generate the first signature Sign_1 by signing for the public key Key_pub_B of the transferee B using the secret key Key_sec_A of the transferor A. In operation S2526a, the second user apparatus 230a may transmit the first signature Sign_1 to the first user apparatus 200a.

Operations S2532a, S2534a, S2536a, and S2538a may correspond to operation S2530 in FIG. 14A. In operation S2532a, the second user apparatus 230a may request a signature of the product 100a for the public key Key_pub_B of the transferee B. In operation S2534a, the product 100 may generate the second signature Sign_2 by signing for the public key Key_pub_B of the transferee B using the secret key Key_sec_P of the product 100a. In operation S2536a, the product 100a may transmit the second signature Sign_2 to the second user apparatus 230a. In operation S2538a, the second user apparatus 230a may transmit the second signature Sign_2 to the first user apparatus 200a.

In operation S2540a, the first user apparatus 200a may verify the transferor A and the product 100a that are signers of the first signature Sign_1 and the second signature Sign_2 by using the block chain data.

Referring to FIG. 14C, in operation S2510b, the second user apparatus 200b may generate the public key Key_pub_B and the secret key Key_sec_B of the transferee B.

Operations S2522b, S2524b, and S2526b may correspond to operation S2520 in FIG. 14A. In operation S2522b, the first user apparatus 200b may request a signature of transferor A for the public key Key_pub_B of the transferee B. In operation S2524b, the second user apparatus 230b of transferor A may generate the first signature Sign_1 by signing for the public key Key_pub_B of the transferee B using the secret key Key_sec_A of transferor A. In operation S2526b, the second user apparatus 230b may transmit the first signature Sign_1 to the first user apparatus 200b.

Operations S2532b, S2534b and S2536b may correspond to operation S2530 in FIG. 14A. In operation S2532b, the first user apparatus 200b may request a signature of the product 100b for the public key Key_pub_B of the transferee B. In operation S2534a, the product 100b may generate the second signature Sign_2 by signing for the public key Key_pub_B of the transferee B using the secret key Key_sec_P of the product 100b. In operation S2536b, the product 100b may transmit the second signature Sign_2 to the first user apparatus 200b.

In operation S2540, the first user apparatus 200b may verify transferor A and the product 100b that are signers of the first signature Sign_1 and the second signature Sign_2 by using the block chain data.

Figure 15:
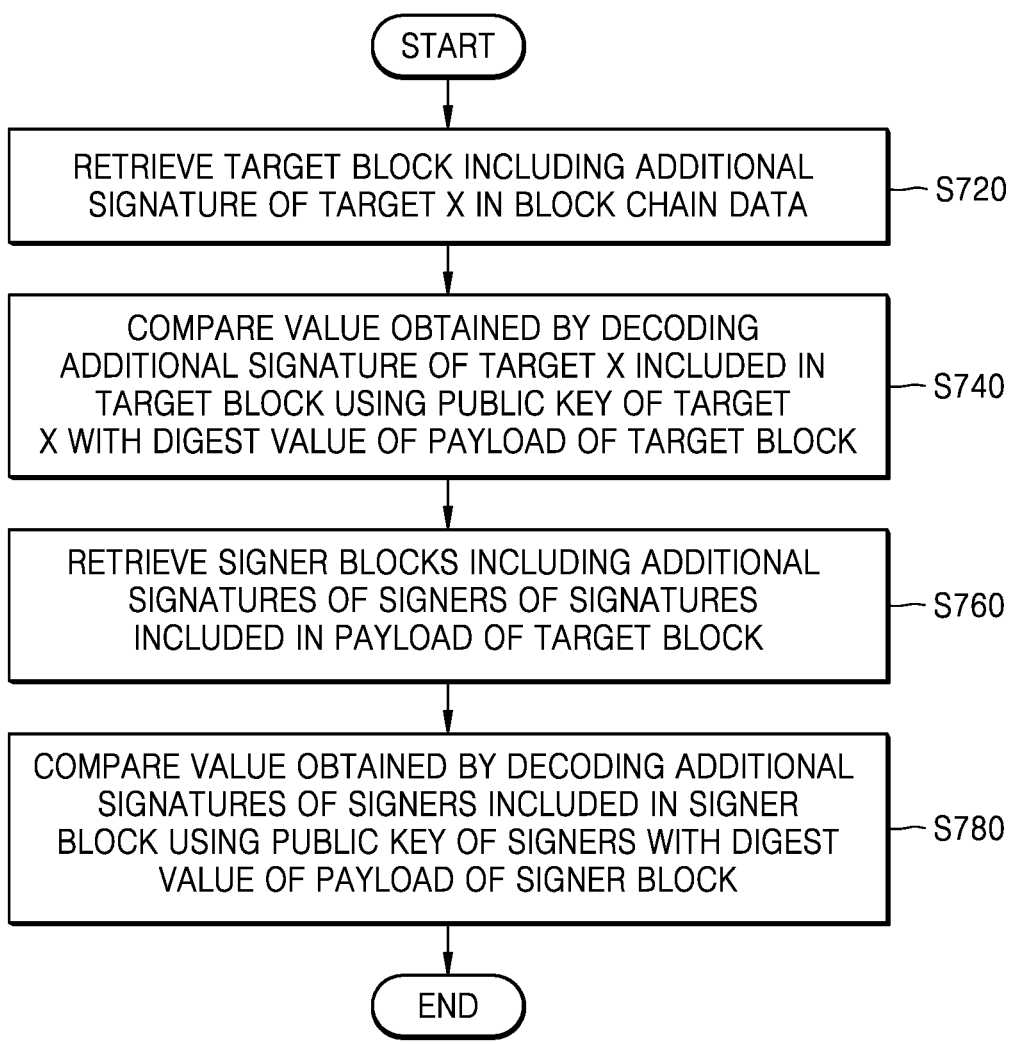
FIG. 15 is a flowchart of a target verification method according to an example embodiment.

FIG. 15 is a flowchart of a target verification method according to an example embodiment. FIG. 15 is described with reference to FIG. 1, based on an assumption that the user apparatus 200 verifies a target X such as the product 100 or the manufacturer 400.

In operation S720, the user apparatus 200 may retrieve a target block including an additional signature of the target X in block chain data.

In operation S740, the user apparatus 200 compares a value, obtained by decoding the additional signature of the target X included in the target block by using a public key of the target X, with a digest value of a payload of the target block and determine whether the value obtained by decoding the additional signature and the digest value are the same value. In an embodiment, the digest value of the payload may be a hash value of the payload. The same process as in operation S740 may be referred to as authentication of the additional signature included in a data block.

In operation S760, the user apparatus 200 may retrieve signer blocks including additional signatures of signers of signatures included in the payload of the target block in the block chain data. In an embodiment, operation S760 may be performed upon authentication of the additional signature included in the target block.

In operation S780, the user apparatus 200 compares a value obtained by decoding the additional signatures of the signers included in the signer blocks using the public key of the signers with a digest value of a payload of the signer blocks to determine whether the value obtained by decoding the additional signatures of the signers and the digest value are the same value. In an embodiment, the digest value of the payload may be the hash value of the payload. The user apparatus 200 may verify the target X based on a determination that the value obtained by decoding the additional signatures of the signers and the digest value of the payload of the signer blocks are the same value.

Figure 16A:
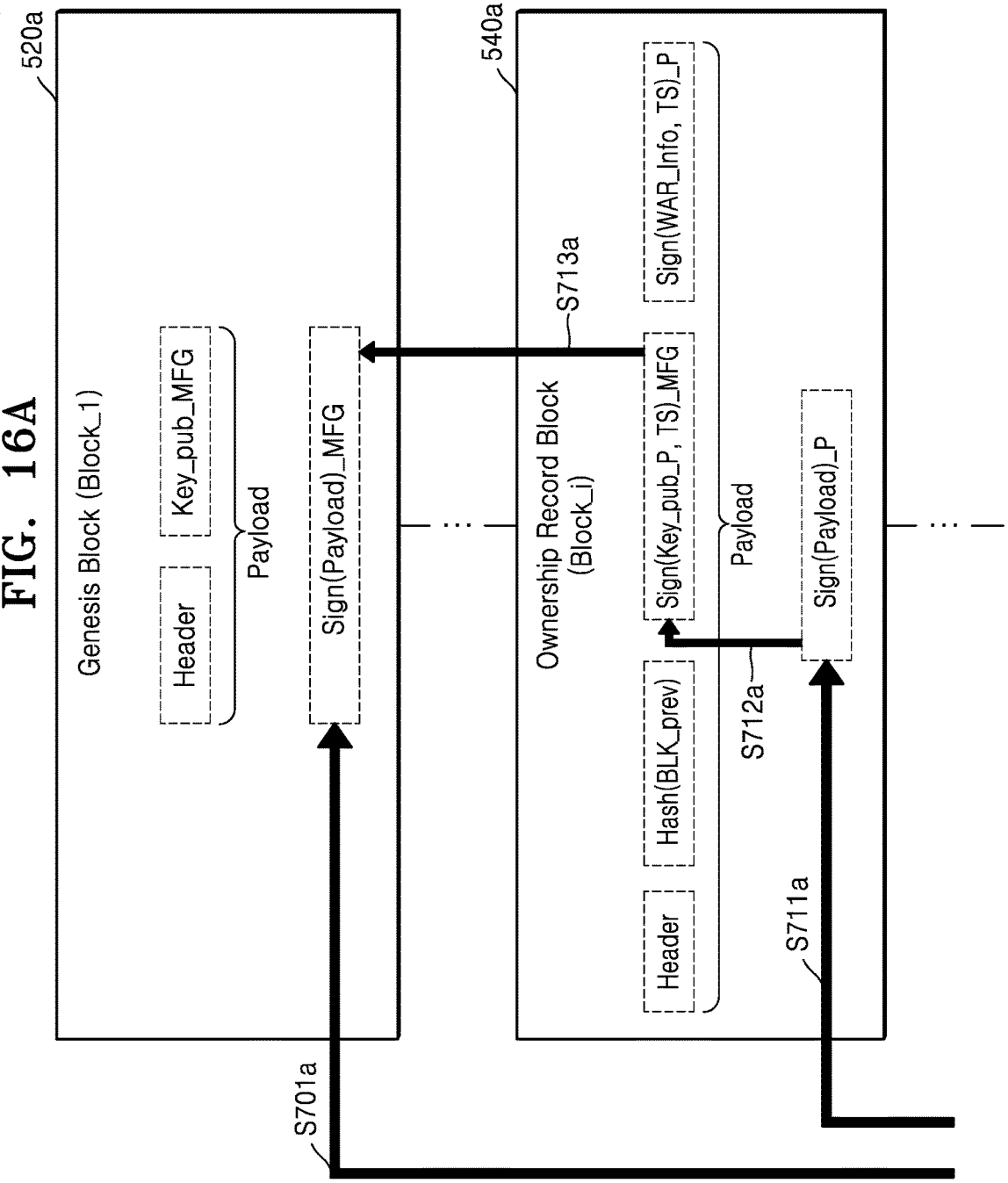
FIG. 16A is a view of block chain data for explaining a target verification sequence in an ownership registration operation, according to an example embodiment.

FIG. 16A is a view of block chain data BC_Data for explaining a target verification sequence in an ownership registration operation, according to an example embodiment. FIG. 16A shows a genesis block 520a and a product ownership record block 540a to explain operation S1540 of FIG. 11A for verifying the manufacturer and the product. In other words, the block chain data BC_Data may include a plurality of blocks, wherein the plurality of blocks may include the genesis block 520a as a first block and the product ownership record block 540a as an $i^{th}$ block. FIG. 16A will be described with reference to FIG. 9.

In operation S701a, in order to verify the manufacturer 400, the user apparatus 200 may find the genesis block 520a by retrieving a block including an additional signature of the manufacturer 400 in the block chain data BC_Data. The authentication of the additional signature may follow the method of operation S740 of FIG. 15. Since a payload of the genesis block 520a does not include a signature, further verification for a signer may not be performed.

In operation S711a, in order to verify the product 100, the user apparatus 200 may find the product ownership record block 540a by retrieving a block including the additional signature of the product 100 in the block chain data BC_Data and may authenticate the additional signature included in the product ownership record block 540a according to the method of operation S740 of FIG. 15. In operation S712a, the user apparatus 200 may find a signer of a signature included in a payload of ownership record block 540a. Thereafter, in operation S713a, the user apparatus 200 may perform a verification process for the manufacturer 400 as a signer.

Figure 16B:
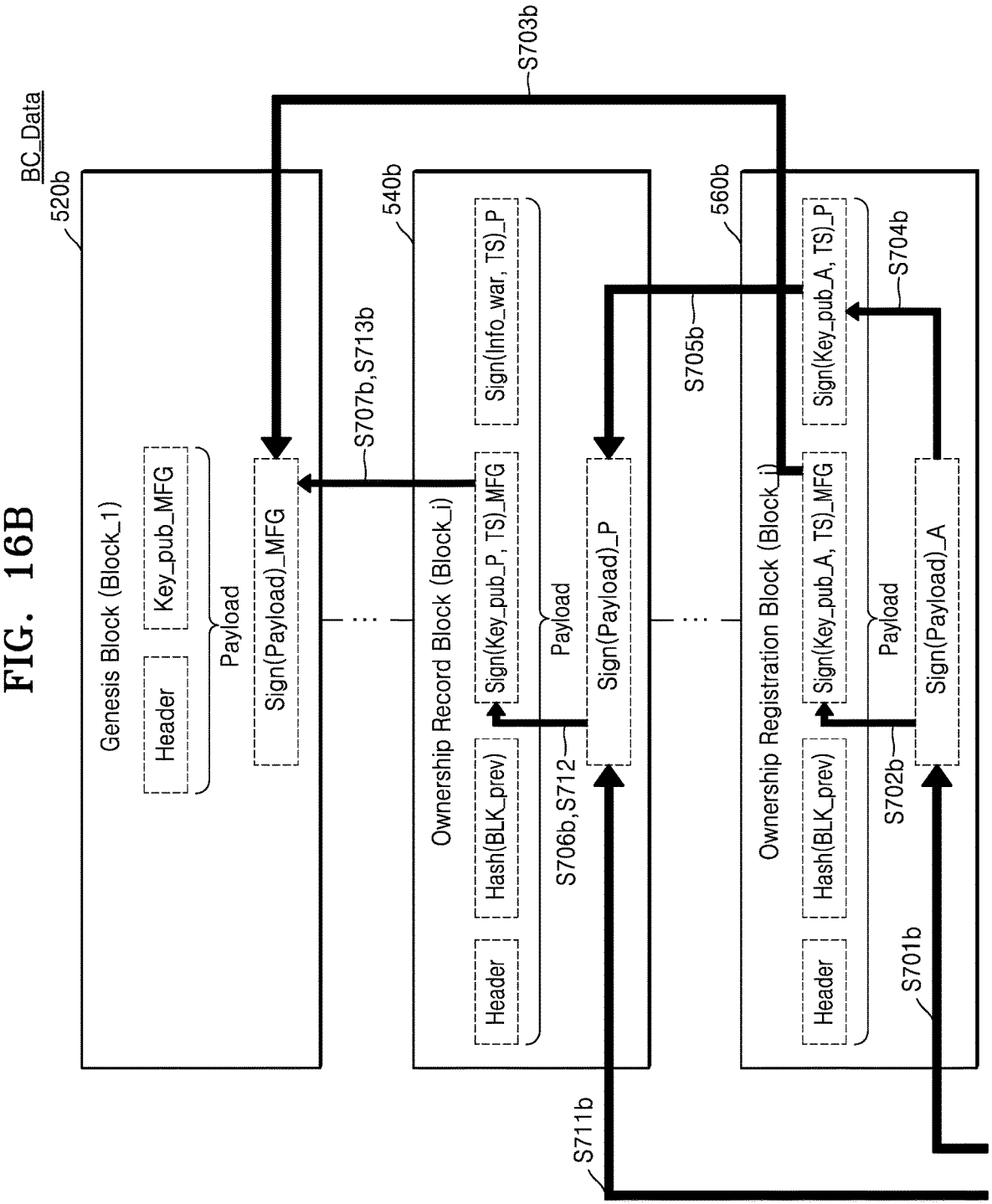
FIG. 16B is a view of block chain data for explaining a target verification sequence in an ownership transfer operation, according to an example embodiment.

FIG. 16B is a view of the block chain data BC_Data for explaining a target verification sequence in an ownership transfer operation, according to an example embodiment. FIG. 16B shows a genesis block 520b, a product ownership record block 540b, and a product ownership registration block 560b to explain operation S2540 of FIG. 14A for verifying the transferor and the product. In other words, the block chain data BC_Data may include a plurality of blocks, wherein the plurality of blocks may include the genesis block 520b as a first block, the product ownership record block 540b as an $i^{th}$ block, and the product ownership registration block 560b as a $j^{th}$ block. FIG. 16B will be described with reference to FIGS. 12A and 12B. For convenience of description, it is assumed that transferor A has registered product ownership.

In operation S701b, in order to verify transferor A, the first user apparatuses 200a and 200b may find the product ownership registration block 560b by retrieving a block including an additional signature of transferor A and may authenticate an additional signature included in the product ownership registration block 560b. The first user apparatuses 200a and 200b may respectively perform operations S702b, S703b, S704b, S705b, S706b, and S707b to verify manufacturers and products that are signers of signatures included in a payload of the product ownership registration block 560b.

In operation S711b, in order to verify the products 100a and 100b, the first user apparatuses 200a and 200b may find the ownership record block 540b by retrieving a block including an additional signature of the products 100a and 100b and may authenticate an additional signature included in the ownership record block 540b. The first user apparatuses 200a and 200b may verify a manufacturer that is a signer of a signature included in a payload of the ownership record block 540b through operations S712b and S713b.

Figure 17:
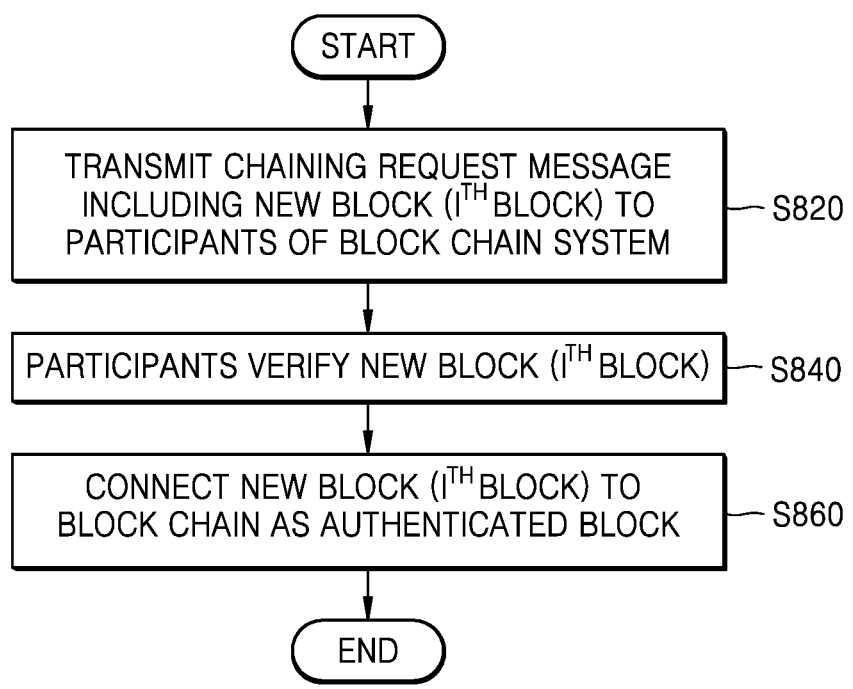
FIG. 17 is a flowchart of a block chain participation process according to an example embodiment.

FIG. 17 is a flowchart of a block chain participation process according to an example embodiment. FIG. 17 may be a flowchart of a process of chaining a new block such as an ownership record block according to FIG. 6, an ownership registration block according to FIG. 10, and/or an ownership transfer block according to FIG. 13 into a block chain. FIG. 17 will be described with reference to FIG. 1.

In operation S820, a generator of the new block may transmit a chaining request message including the new block to participants of the block chain system 10. The generator of the new block may be the manufacturer 400 or the user apparatus 200 depending on the type of the new block. For example, the generator of the new block may transmit the chaining request message to participants through the second network 250. Hereinafter, it is assumed that the new block is included in the block chain as an $i^{th}$ block.

In operation S840, the participants of the block chain system 10 may verify the new block included in the chaining request message. Operation S840 will be described in more detail with reference to FIG. 18 later below.

In operation S860, when the verification of the new block is completed, the participants of the block chain system 10 may connect the new block to the block chain as an authenticated block. That is, the participants may connect the new block to the block chain by chaining the new block to an $(i-1)^{th}$ block which is the last block of block chain data. As described above, the connecting of the new block to the block chain may be expressed as chaining of the new block to the block chain.

Figure 18:
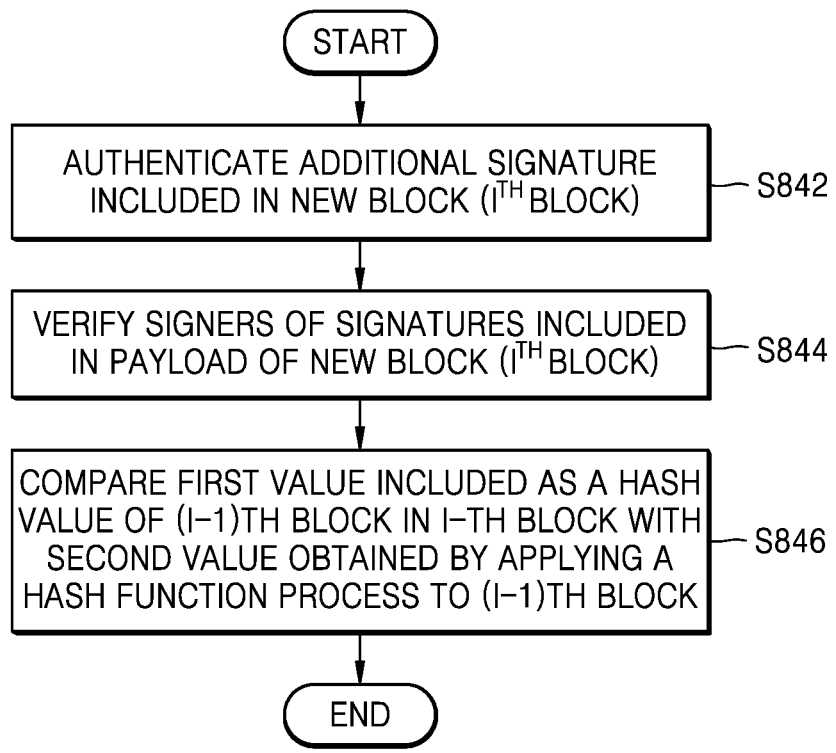
FIG. 18 is a flowchart of a new block verification method according to an example embodiment.

FIG. 18 is a flowchart of a new block verification method according to an example embodiment. FIG. 18 may show an embodiment of operation S840 of FIG. 17. FIG. 18 will be described with reference to FIG. 1.

In operation S842, participants of the block chain system 10 may authenticate an additional signature included in a new block. The additional signature authentication in operation S842 may be performed in a similar or the same manner as the method in operation S740 of FIG. 15.

In operation S844, the participants of the block chain system 10 may verify signers of signatures included in a payload of the new block. The verification of the signers may be performed in a similar or the same manner as the verification method of a target described with reference to FIG. 15.

In operation S846, the participants of the block chain system 10 may determine whether a first value and a second value are equal by comparing the first value with the second value. Here, the first value may indicate a value included as a hash value of an $(i-1)^{th}$ block in the new block. Furthermore, the second value may represent a hash value of the $(i-1)^{th}$ block obtained by applying a hash function process to the $(i-1)^{th}$ block included in block chain data held by the participants. The new block verification is performed based on the result of comparison between the first value and the second value.

FIG. 19A is a flowchart of a block chain participation process in an ownership record operation, according to an example embodiment. FIG. 19A may show an embodiment in which the process of FIG. 17 is applied to chaining of an ownership record block. Therefore, operations S820a, S840a, and S860a may correspond to operations S820, S840, and S860 in FIG. 17, except that a new block is limited to the ownership record block.

In operation S850a, in the process of chaining the ownership record block, participants of the block chain system 10 may confirm whether a signer other than a product among signers of a payload included in the ownership record block is equal to a manufacturer.

In addition, in operation S852a, each of the participants of the block chain system 10 may confirm whether an ownership of the product is already recorded in a block chain using block chain data held by the participant.

In operation S860a, when verification of the ownership record block is completed according to operation S840a, the signer is determined to be the same as the manufacturer, and it is determined that the ownership has not been recorded before, the participants may connect the ownership record block to the block chain as an authenticated block.

Figure 19B:
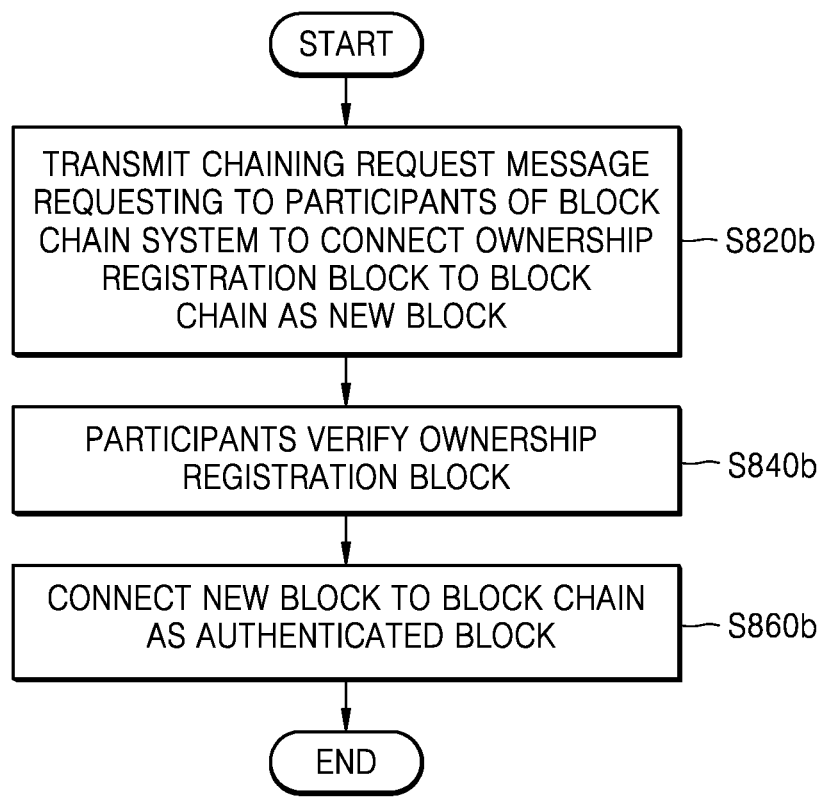
FIG. 19B is a flowchart of a block chain participation process in an ownership registration operation, according to an example embodiment.

FIG. 19B is a flowchart of a block chain participation process in an ownership registration operation, according to an example embodiment. FIG. 19B may show an embodiment in which the process of FIG. 17 is applied to chaining of an ownership registration block. Therefore, operations S820b, S840b, and S860b may correspond to operations S820, S840, and S860 in FIG. 17, except that a new block is limited to the ownership registration block.

Figure 19C:
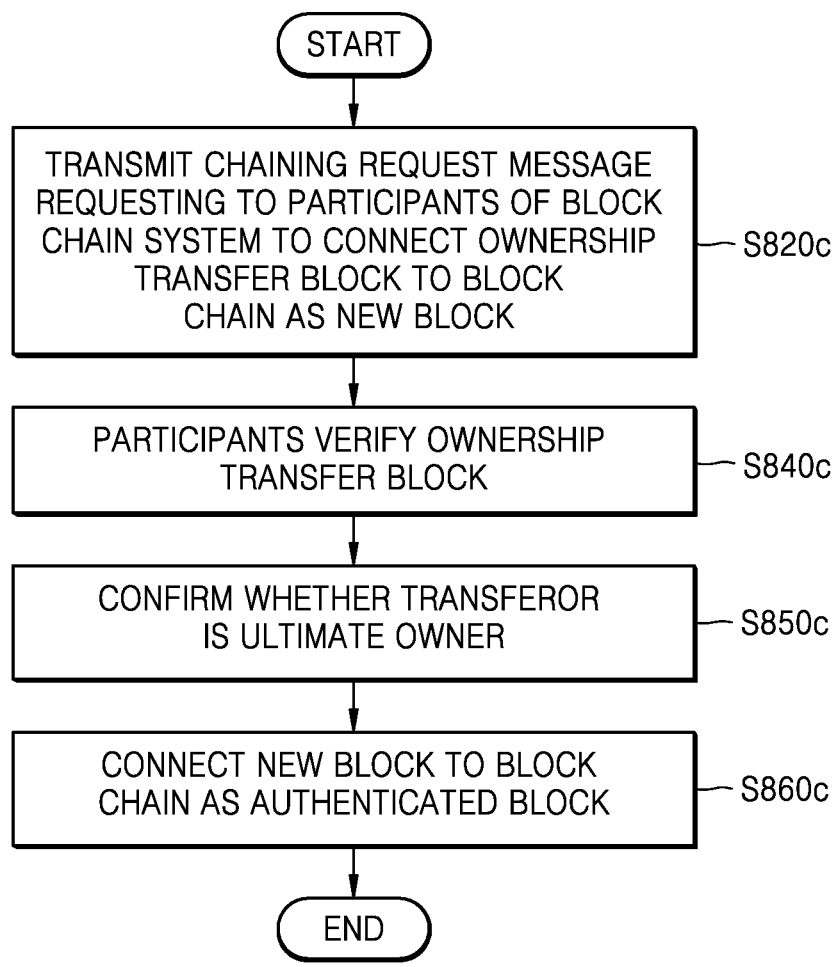
FIG. 19C is a flowchart of a block chain participation process in an ownership transfer operation, according to an example embodiment.

FIG. 19C is a flowchart of a block chain participation process in an ownership transfer operation, according to an example embodiment. FIG. 19C may show an embodiment in which the process of FIG. 17 is applied to chaining of an ownership transfer block. Therefore, operations S820c, S840c, and S860c may correspond to operations S820, S840, and S860 in FIG. 17, except that a new block is limited to the ownership transfer block.

In operation S850c, in the process of chaining the ownership transfer block, participants of the block chain system 10 may confirm whether a transferor is an ultimate owner. For example, each participant may determine whether an ultimate owner of a product obtained using block chain data held by the participant is equal to a transferor, who is a signer of a payload included in the ownership transfer block.

Figure 20:
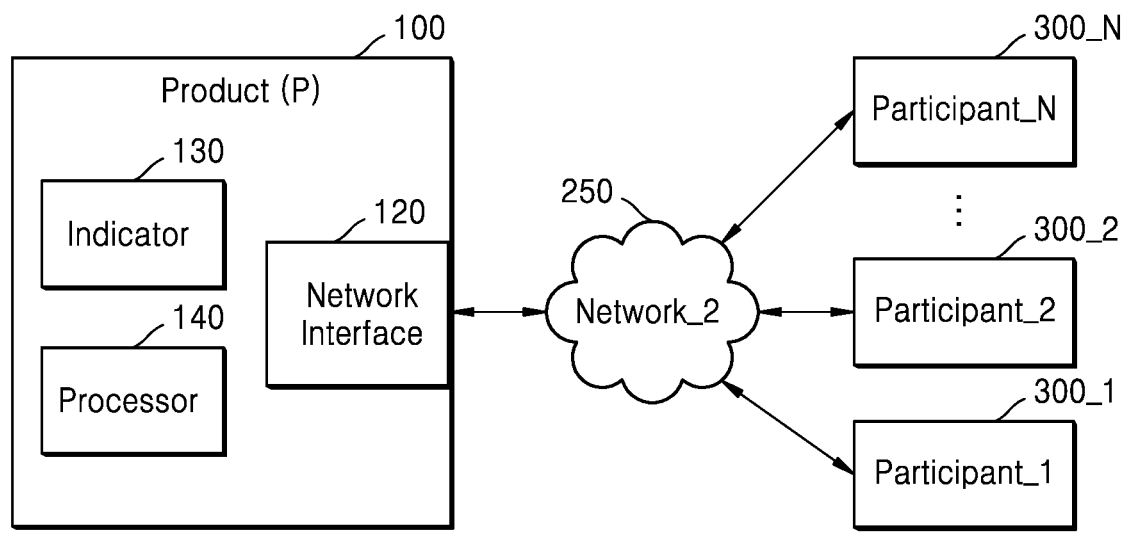
FIG. 20 is a view of a block chain system according to an example embodiment.

FIG. 20 shows a block chain system 20 according to an example embodiment. The block chain system 20 may include the product 100 and a plurality of participants. The product 100 may communicate with the first participant 300_1 to the $N^{th}$ participant 300_N through the second network 250. FIG. 20 may perform a similar or the same function as the block chain system 10 of FIG. 1, except that the product 100 may communicate directly with the plurality of participants. In other words, the block chain system 20 may manage information about the product 100 by using one or more methods described with reference to FIGS. 3 to 19C.

The product 100 may include a network interface 120, an indicator 130, and a processor 140. The product 100 may also include a predetermined memory. The network interface 120 may provide a communication function between the first participant 300_1 to the $N^{th}$ participant 300_N and the product 100. The indicator (or output circuitry) 130 may include any configuration capable of performing a notification function to a user of the product 100 through various sensory methods including, for example but is not limited to, a visual method, an auditory method, a tactile method. The indicator (or output circuitry) 130 may also include, for example but is not limited to, a display, a speaker, a vibration motor, and the like. The indicator 130 may be implemented in any means capable of performing a notification function to a user of the product 100. The processor 140 may perform certain operations performed on the product 100 on an instruction-by-instruction basis. For example, a memory of the product 100 may store instructions for performing certain operations, and the product 100 may perform certain operations as the processor 140 executes the instructions.

The processor 140 may include a central processing unit, a microprocessor, a digital signal processor, an application processor, a programmable array, an application-specific integrated circuit or the like.

Figure 21:
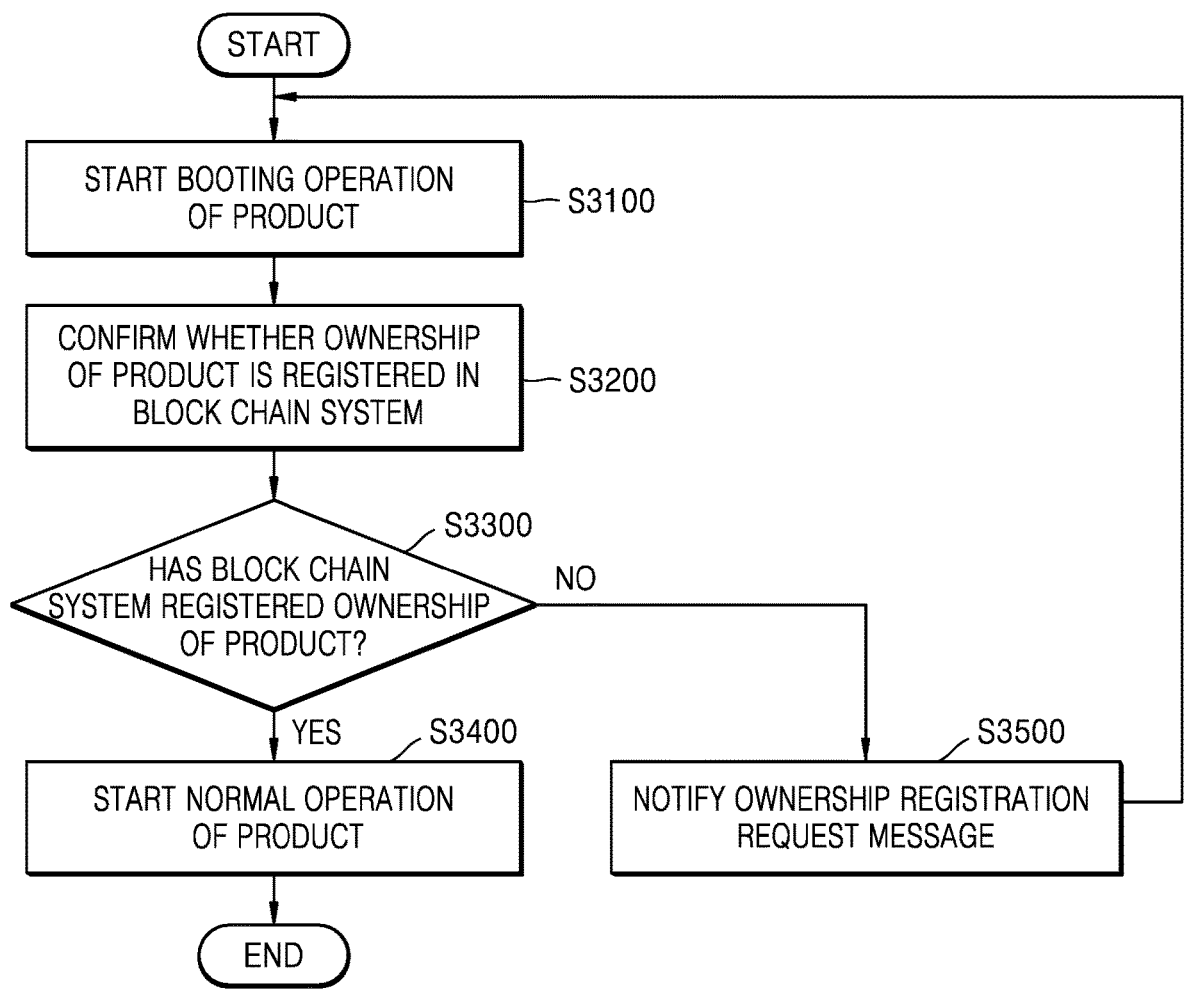
FIG. 21 is a flowchart of a product booting method according to an example embodiment.

FIG. 21 is a flowchart of a product booting method according to an example embodiment. FIG. 21 will be described with reference to FIG. 20.

In operation S3100, the product 100 may perform a booting operation at an activation stage of the product 100.

In operation S3200, the product 100 may confirm whether ownership of the product 100 is registered in the block chain system 20.

In operation S3300, depending on whether the block chain system 20 has registered the ownership of the product 100, subsequent operations may be performed differently.

In operation S3400, when the block chain system 20 has the ownership of the product 100, the product 100 may start a normal operation.

In operation S3500, when the block chain system 20 does not have the ownership of the product 100, the product 100 may not start a normal operation, and at this time, an ownership registration request message, requesting registration of ownership of the product 100, may be notified to a user of the product 100. In an embodiment, the product 100 may display the ownership registration request message to the user through the indicator 130.

Figure 22:
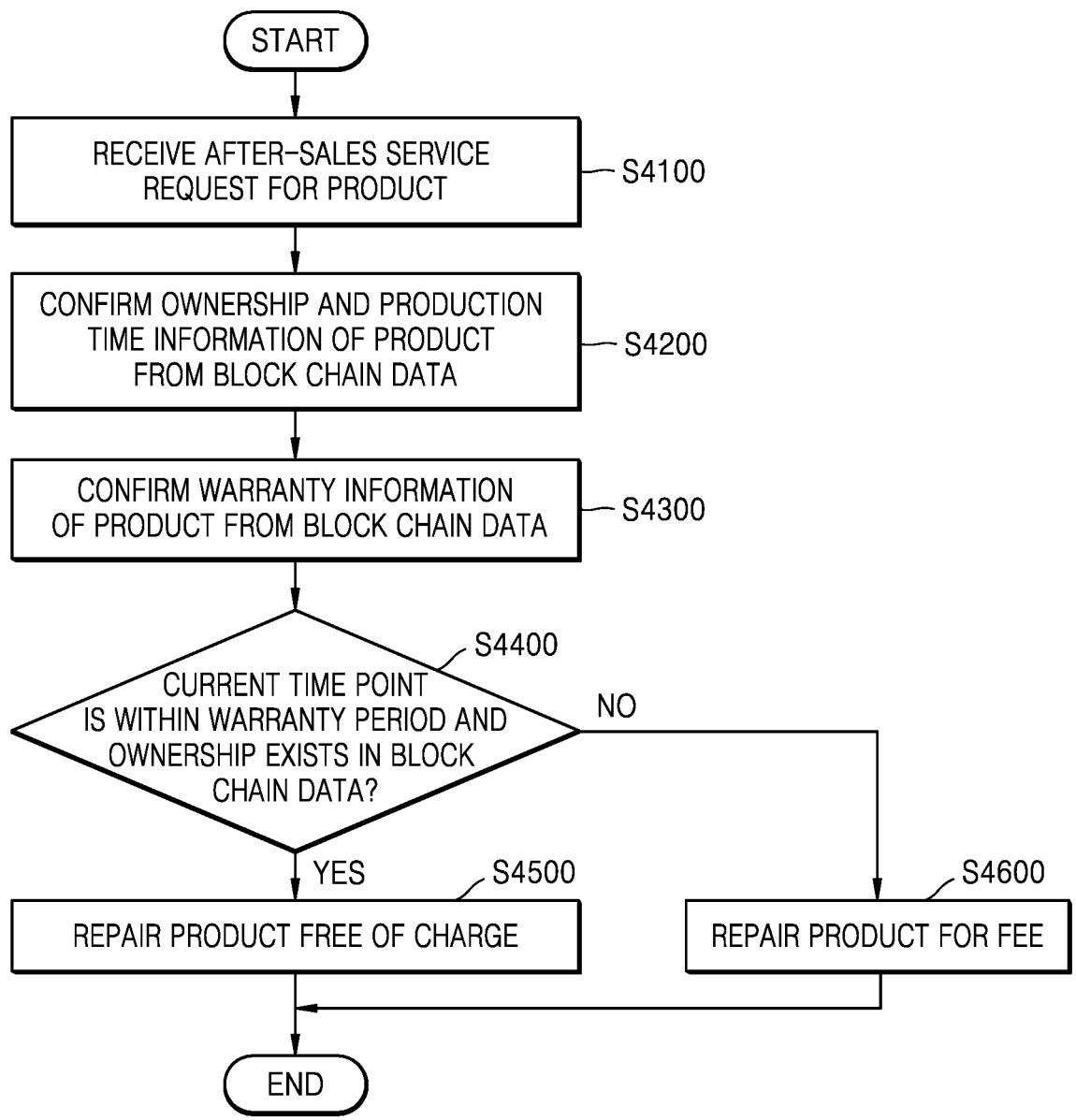
FIG. 22 is a flowchart of a manufacturer's product repair process, according to an example embodiment.

FIG. 22 is a flowchart of a manufacturer's product repair process, according to an example embodiment.

In operation S4100, the manufacturer may receive an after-sales service request for a product.

In operation S4200, the manufacturer may receive block chain data from a block chain system and confirm ownership and production time information of the product (e.g. information about time when the product is produced) from block chain data. For example, a time stamp inside a block included in the block chain data may be utilized.

In operation S4300, the manufacturer may confirm warranty information of the product from the block chain data. The warranty information of the product may be included in an ownership block for the product.

In operation S4400, depending on whether a current time point is within a warranty period and whether ownership exists in the block chain data, subsequent operations may be performed differently.

In operation S4500, when the current time point is within the warranty period and the ownership exists in the block chain data, the manufacturer may repair the product free of charge.

On the other hand, in operation S4600, when the current time point is out of the warranty period, or when the ownership does not exist in the block chain data, the manufacturer may repair the product for a fee.

An example embodiment may be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs.

At least one of the components, elements, modules or units described herein may be embodied as various numbers of hardware, software and/or firmware structures that execute respective functions described above and may include circuitry, a processor, a microprocessor, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

Example embodiments have been illustrated and described in the drawings and the detailed description as described above. Although the specific terms are used to explain these example embodiments in the disclosure, the specific terms are not intended to restrict the scope and are only used for a better understanding. It will be understood by those of ordinary skill in the art that various changes in form and details may be made without departing from the spirit and scope of the invention as defined by the appended claims. Therefore, the scope is defined not by the detailed description but by the appended claims.

What is claimed is:

1. An electronic device configured to participate in a block chain system, the electronic device comprising:
a network interface configured to communicate, by using a first network, with participants of the block chain system to share block chain data, the block chain data comprising at least one of an ownership record block and an ownership registration block for the electronic device;
an indicator configured to output a notification signal to a user of the electronic device; and
a processor configured to determine, during a booting operation of the electronic device, whether ownership of the electronic device is registered in the block chain data through the network interface and to control the indicator to output the notification signal requesting registration of the ownership of the electronic device based on a determination that the ownership of the electronic device is not registered in the block chain data, wherein the ownership record block comprises a digital signature for a public key of the electronic device done by a manufacturer of the electronic device and a digital signature for warranty information about the electronic device done by the electronic device, and wherein the ownership registration block comprises a digital signature for a public key of the user of the electronic device done by the manufacturer and a digital signature for the public key of the user of the electronic device done by the electronic device.

2. A user apparatus for participating in a block chain system, the user apparatus configured to communicate with a product, which is an electronic apparatus, through a first network, the user apparatus comprising:

at least one processor; and at least one memory configured to store instructions, which, when executed by the at least one processor, cause the at least one processor to perform:

receiving block chain data from at least one of block chain participants of the block chain system, the at least one of the block chain participants being connected to the user apparatus through a second network;

transmitting, to each of a manufacturer of the product and the product, a request for a digital signature for a first public key corresponding to the user apparatus;

receiving a first signature from the manufacturer and a second signature from the product through a corresponding network, respectively;

generating a new block including a payload, the payload comprising the first signature and the second signature, and a third signature for the payload using a secret key of the user apparatus; and requesting the block chain participants to chain the new block to the received block chain data of the block chain system by connecting the new block to the received block chain data.

3. The user apparatus of claim 2, wherein the third signature comprises a hash value of a last block included in the received block chain data, the first signature and the second signature.

4. The user apparatus of claim 2, wherein the instructions further cause the at least one processor to perform at least one of:

verify the manufacturer using the received block chain data; and verify the product using the received block chain data.

5. The user apparatus of claim 4, wherein the verifying the manufacturer comprises:

retrieving a target block comprising an additional signature of the manufacturer from the received block chain data;

authenticating the additional signature of the manufacturer included in the target block, by using the additional signature of the manufacturer and a target payload included in the target block; and verifying signers of signatures included in the target payload.

6. The user apparatus of claim 5, wherein the authenticating the additional signature of the manufacturer comprises comparing a value, obtained by decoding the additional signature of the manufacturer using a public key of the manufacturer, with a digest value of the target payload.

7. The user apparatus of claim 6, wherein the digest value of the target payload is a hash value of the target payload.

8. The user apparatus of claim 2, wherein the new block comprises a data block for registering the product to a block chain.

9. The user apparatus of claim 2, wherein the manufacturer further comprises at least one from among a transferor of the product and a user apparatus of the transferor.

10. The user apparatus of claim 9, wherein the first signature comprises a digital signature generated using a secret key of the user apparatus of the transferor, and the second signature comprises a digital signature generated using a secret key of the product.

11. The user apparatus of claim 9, wherein the new block comprises a data block for writing, to a block chain, information about ownership transfer of the product.

12. The user apparatus of claim 2, wherein a genesis block of the block chain data comprises a genesis payload comprising a public key of the manufacturer and a digital signature of the manufacturer for the genesis payload.

13. The user apparatus of claim 2, wherein the block chain data comprises an ownership record block of the product, and the ownership record block of the product comprises:

a digital signature of the manufacturer for a public key of the product; and a digital signature of the product for warranty information of the product.

14. A method of managing product information of a product by using a block chain system, the method comprising:

generating a genesis block of block chain data used in the block chain system, the genesis block including a first payload and a first signature of a manufacturer of the product for the first payload, the first payload comprising a public key of the manufacturer, and the first signature being generated by encrypting a digest value of the first payload using a secret key of the manufacturer;

generating a second payload comprising a second signature of the manufacturer for a public key of the product and a third signature of the product for a warranty information of the product;

generating an ownership record block for the product based on the second payload and a fourth signature of the product for the second payload; and transmitting a chaining request message including the ownership record block to a plurality of participants of the block chain system.

15. The method of claim 14, wherein the generating the second payload comprises:

receiving, from the product, the third signature of the product for a time stamp; and generating the second payload based on the second signature and the third signature.

* * * * *